(12) United States Patent
Chen et al.

(10) Patent No.: US 12,293,039 B2
(45) Date of Patent: May 6, 2025

(54) TOUCH DISPLAY PANEL INCLUDING TOUCH ELECTRODE WIRING LAYER AND SIGNAL TRANSMISSION WIRING LAYER

(71) Applicant: Wuhan China Star Optoelectronics Semiconductor Display Technology Co., Ltd., Hubei (CN)

(72) Inventors: Chao Chen, Hubei (CN); Jian Ye, Hubei (CN); Simin Zhu, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/442,192

(22) PCT Filed: Aug. 3, 2021

(86) PCT No.: PCT/CN2021/110257
§ 371 (c)(1),
(2) Date: Sep. 23, 2021

(87) PCT Pub. No.: WO2023/004843
PCT Pub. Date: Feb. 2, 2023

(65) Prior Publication Data
US 2024/0028158 A1    Jan. 25, 2024

(30) Foreign Application Priority Data

Jul. 27, 2021   (CN) .................. 202110849305.X

(51) Int. Cl.
*G06F 3/041* (2006.01)
*G06F 3/044* (2006.01)

(52) U.S. Cl.
CPC ........ *G06F 3/0418* (2013.01); *G06F 3/04164* (2019.05); *G06F 3/0446* (2019.05)

(58) Field of Classification Search
CPC .......... G06F 3/041–0418; G06F 3/044; G06F 3/0443–0448; G06F 2203/04111–04112
See application file for complete search history.

(56) References Cited

U.S. PATENT DOCUMENTS

2014/0209358 A1    7/2014  Lebens et al.
2014/0300834 A1*  10/2014  Shinoda ................ G06F 1/1692
                                                                    174/133 R
(Continued)

FOREIGN PATENT DOCUMENTS

CN          104102401        10/2014
CN          105549801         5/2016
(Continued)

OTHER PUBLICATIONS

International Search Report and the Written Opinion Dated Apr. 26, 2022 From the International Searching Authority Re. Application No. PCT/CN2021/110257 and Its Translation Into English. (13 Pages).

(Continued)

*Primary Examiner* — Keith L Crawley

(57) ABSTRACT

Embodiments of the present disclosure disclose a touch display panel, which includes a plurality of touch sub-units and a plurality of connection wires, wherein the plurality of touch sub-units include the touch sub-units extending in a first direction and a second direction, and two adjacent columns of the touch sub-units extending in the second direction are electrically connected via connection wires; in one of touch electrode repetition units, the connection wires distributed in the first direction are disposed in a misaligned manner in the second direction.

16 Claims, 14 Drawing Sheets

(56) References Cited

U.S. PATENT DOCUMENTS

| | | | |
|---|---|---|---|
| 2016/0246433 A1 | 8/2016 | Lee et al. | |
| 2017/0102811 A1* | 4/2017 | Chen | G02F 1/13338 |
| 2018/0107319 A1* | 4/2018 | Chou | G06F 3/0412 |
| 2019/0179445 A1* | 6/2019 | Moon | G09G 3/2003 |
| 2021/0157466 A1* | 5/2021 | Jin | G06F 3/04164 |
| 2022/0019306 A1* | 1/2022 | Koide | G06F 3/044 |
| 2022/0035487 A1* | 2/2022 | Wang | G06F 3/0412 |
| 2022/0334678 A1* | 10/2022 | Long | G06F 3/0443 |

FOREIGN PATENT DOCUMENTS

| | | |
|---|---|---|
| CN | 206610273 | 11/2017 |
| CN | 108628047 | 10/2018 |
| CN | 109901739 | 6/2019 |
| CN | 110034168 | 7/2019 |
| CN | 110888564 | 3/2020 |
| CN | 112394843 | 2/2021 |
| JP | 2015-165377 | 9/2015 |

OTHER PUBLICATIONS

Notification of Office Action and Search Report Dated Apr. 15, 2023 From The State Intellectual Property Office of the People's Republic of China Re. Application No. 202110849305.X and Its Translation Into English. (23 Pages).

\* cited by examiner

TOUCH DISPLAY PANEL INCLUDING TOUCH ELECTRODE WIRING LAYER AND SIGNAL TRANSMISSION WIRING LAYER

RELATED APPLICATIONS

This application is a National Phase of PCT Patent Application No. PCT/CN2021/110257 having International filing date of Aug. 3, 2021, which claims the benefit of priority of Chinese Patent Application No. 202110849305.X filed on Jul. 27, 2021. The contents of the above applications are all incorporated by reference as if fully set forth herein in their entirety.

FIELD AND BACKGROUND OF THE INVENTION

The present disclosure relates to the technical field of display, and specifically to a touch display panel.

As shown in FIG. 1, the existing touch display panel includes two touch elements, i.e., touch electrodes 1' and signal transmission wires 2'. Multiple signal transmission wires 2' are located under the touch electrodes 1'. Each target signal transmission wire 21' is used to transmit a touch signal of a target touch sub-unit 11'. There is a parasitic capacitance between each target signal transmission wire 21' and other surrounding touch electrodes. A parasitic capacitance is also formed between the target touch sub-unit 11' and other signal transmission wires. Since a sum of the parasitic capacitances accounts for more than 50% of a parasitic capacitance of a touch structure, a driving load of a touch chip is greatly increased, which is not conducive to the application and experience of high-performance touch display panels.

SUMMARY OF THE INVENTION

An embodiment of the present disclosure provides a display panel, which solves a technical problem that excessive parasitic capacitance affects touch experience and performance in the prior art.

An embodiment of the present disclosure provides a touch display panel including a touch electrode wiring layer and a signal transmission wiring layer, wherein the touch electrode wiring layer includes a plurality of touch electrode repetition units, each of the touch electrode repetition units includes a plurality of touch sub-units and a plurality of connection wires, the plurality of touch sub-units include a part of the touch sub-units extending in a first direction and a part of the touch sub-units extending in a second direction, and two adjacent columns of the touch sub-units extending in the first direction are electrically connected via the connection wires; wherein the signal transmission wiring layer includes a plurality of signal transmission wires extending in the second direction; wherein an orthographic projection of each of the signal transmission wires on the touch electrode wiring layer is located between the two adjacent columns of the touch sub-units, and the orthographic projection of each of the signal transmission wires on the touch electrode wiring layer at least partially overlaps with one of the connection wires; and wherein in each of the touch electrode repetition units, the connection wires distributed in the first direction are disposed in a misaligned manner in the second direction.

Optionally, in some embodiments of the present disclosure, in each of the touch electrode repetition units, one of the connection wires is provided in one row of touch sub-units extending in the first direction.

Optionally, in some embodiments of the present disclosure, in each of the touch electrode repetition units, one of the connection wires is provided between two adjacent columns of the touch sub-units extending in the second direction.

Optionally, in some embodiments of the present disclosure, the touch electrode wiring layer includes the plurality of touch electrode repetition units arranged in an array manner, and the plurality of touch sub-units in each of the touch electrode repetition units are arranged in an array manner, a row direction of the plurality of touch sub-units is parallel to the first direction, and a column direction of the plurality of touch sub-units is parallel to the second direction; in each of the touch electrode repetition units, at least one position for each column of touch sub-units connected to at least one of the connection wires is configured to define at least one connection position of the column of touch sub-units; each column of touch sub-units in each of the touch electrode repetition units has only one connection position; a position in the column direction for a first connection wire connected to a first column of touch sub-units in each of the touch electrode repetition units is configured to define an initial connection position of the touch electrode repetition unit; the connection position for a second column of touch sub-units in each of the touch electrode repetition units is located at an intermediate position in the column direction between two of the initial connection positions adjacent in the column direction, and a second connection wire is connected to the second column of touch sub-units at the connection position for the second column of touch sub-units; the connection position for a third column of touch sub-units in each of the touch electrode repetition units is located at an intermediate position in the column direction between the initial connection position and the connection position for the second column of touch sub-units, and a third connection wire is connected to the third column of touch sub-units at the connection position for the third column of touch sub-units; and the connection position for a fourth column of touch sub-units in each of the touch electrode repetition units is located at an intermediate position in the column direction between the initial connection position of the touch electrode repetition unit and the connection position for the second column of touch sub-units adjacent in the column direction, and a fourth connection wire is connected to the fourth column of touch sub-units at the connection position for the fourth column of touch sub-units.

Optionally, in some embodiments of the present disclosure, each of the touch electrode repetition units includes six columns of the touch sub-units, each column of touch sub-units includes six rows of the touch sub-units, and the touch electrode repetition unit includes six of the connection wires; and the touch sub-unit located in the first row of the first column is connected to the first connection wire, the touch sub-unit located in the fourth row of the second column is connected to the second connection wire, the touch sub-unit located in the second row of the third column is connected to the third connection wire, the touch sub-unit located in the fifth row of the fourth column is connected to the fourth connection wire, the touch sub-unit located in the third row of the fifth column is connected to a fifth connection wire, and the touch sub-unit located in the sixth row of the sixth column is connected to a sixth connection wire.

Optionally, in some embodiments of the present disclosure, the plurality of connection wires in each of the touch electrode repetition units are distributed in a stepped manner.

Optionally, in some embodiments of the present disclosure, the plurality of connection wires are evenly distributed in the second direction.

Optionally, in some embodiments of the present disclosure, each of the connection wires has an arc and/or a corner.

Optionally, in some embodiments of the present disclosure, an orientation of the arc or the corner of one of the connection wires is opposite to an orientation of the arc or the corner of another of the connection wires adjacent to the one of the connection wires.

Optionally, in some embodiments of the present disclosure, the plurality of the connection wires are evenly distributed in the second direction.

Optionally, in some embodiments of the present disclosure, the touch electrode wiring layer includes the plurality of touch electrode repetition units arranged in an array manner, and each of the touch electrode repetition units includes the plurality of touch sub-units arranged in an array manner; each of the touch electrode repetition units includes a first column of touch sub-units, a second column of touch sub-units, and a third column of touch sub-units, the second column of touch sub-units are located between the first column of touch sub-units and the third column of touch sub-units, the second column of touch sub-units are disposed adjacent to the first column of touch sub-units and the third column of touch sub-units; the first column of touch sub-units and the second column of touch sub-units are electrically connected via M connection wires, the second column of touch sub-units and the third column of touch sub-units are electrically connected via N connection wires, M and N are both odd-numbers, and M and N are equal; the touch electrode repetition unit is divided into a first repetition sub-unit and a second repetition sub-unit in a column direction; there are m1 connection wires between the first and second columns of the touch sub-units located in the first repetition sub-unit, and there are m2 connection wires between the first and second columns of the touch sub-units located in the second repetition sub-units, m1 is an odd number, m2 is an even number, and a sum of m1 and m2 is M; and there are n1 connection wires between the second and third columns of the touch sub-units located in the first repetition sub-unit, and there are n2 connection wires between the second and third columns of the touch sub-units located in the second repetition sub-units, n1 is an even number, n2 is an odd number, and a sum of n1 and n2 is N.

The present disclosure also provides a touch display panel, including a touch electrode wiring layer and a signal transmission wiring layer, wherein the touch electrode wiring layer includes a plurality of touch electrode repetition units, each of the touch electrode repetition units includes a plurality of touch sub-units and a plurality of connection wires, the plurality of touch sub-units include a part of the touch sub-units extending in a first direction and a part of the touch sub-units extending in a second direction, and two adjacent columns of the touch sub-units extending in the first direction are electrically connected via the connection wires; wherein the signal transmission wiring layer includes a plurality of signal transmission wires extending in the second direction; wherein an orthographic projection of each of the signal transmission wires on the touch electrode wiring layer is located between two adjacent columns of the touch sub-units, and the orthographic projection of each of the signal transmission wires on the touch electrode wiring layer at least partially overlaps with one of the connection wires; and wherein an area where an orthographic projection of each of the signal transmission wires on the touch electrode wiring layer overlaps with the connection wire is equal.

Optionally, in some embodiments of the present disclosure, the touch electrode wiring layer includes the plurality of touch electrode repetition units arranged in an array manner, and the touch electrode repetition unit comprises the plurality of touch sub-units arranged in an array manner; the touch electrode repetition unit includes a first column of touch sub-units, a second column of touch sub-units, and a third column of touch sub-units, the second column of touch sub-units are located between the first column of touch sub-units and the third column of touch sub-units, the second column of touch sub-units are disposed adjacent to the first column of touch sub-units and the third column of touch sub-units; the first column of touch sub-units and the second column of touch sub-units are electrically connected via M connection wires, the second column of touch sub-units and the third column of touch sub-units are electrically connected via N connection wires, M and N are both odd-numbers, and M and N are equal; the touch electrode repetition unit is divided into a first repetition sub-unit and a second repetition sub-unit in a column direction; there are m1 connection wires between the first and second columns of the touch sub-units located in the first repetition sub-unit, and there are m2 connection wires between the first and second columns of the touch sub-units located in the second repetition sub-units, m1 is an odd number, m2 is an even number, and a sum of m1 and m2 is M; and there are n1 connection wires between the second and third columns of the touch sub-units located in the first repetition sub-unit, and there are n2 connection wires between the second and third columns of the touch sub-units located in the second repetition sub-units, n1 is an even number, n2 is an odd number, and a sum of n1 and n2 is N.

Optionally, in some embodiments of the present disclosure, further including a plurality of redundant touch sub-units arranged in an array manner; wherein a plurality of redundant compensation electrode patterns are provided between the redundant touch sub-units and the touch sub-units adjacent to the redundant touch sub-units in a row direction, and the redundant compensation electrode patterns are located on the signal transmission wiring layer.

Optionally, in some embodiments of the present disclosure, further including a plurality of redundant signal transmission wires; wherein a plurality of redundant compensation electrode patterns are provided between adjacent two of the redundant signal transmission wires, and the redundant compensation electrode patterns are located on the touch electrode wiring layer.

Optionally, in some embodiments of the present disclosure, the plurality of touch sub-units and the plurality of the connection wires enclose to form a plurality of hollow areas, and the hollow areas are evenly distributed in the column direction between two adjacent columns of the touch sub-units.

Optionally, in some embodiments of the present disclosure, the touch electrode wiring layer includes the plurality of touch electrode repetition units arranged in an array manner, the touch electrode repetition unit has a grid-like rectangle predetermined wiring pattern including two predetermined diagonal lines and predetermined connection lines connecting four midpoints of four edges; and the touch electrode repetition unit is provided with a hollow pattern based on the predetermined wiring pattern, the hollow pattern is composed of a plurality of broken lines, and the hollow pattern is distributed uniformly in the column direction between two adjacent columns of the touch sub-units.

Optionally, in some embodiments of the present disclosure, the touch electrode repetition unit is provided with a first hollow pattern based on the predetermined wiring pattern, and the first hollow pattern is composed of three broken lines; the two diagonal lines are a first predetermined diagonal line and a second predetermined diagonal line, and an intersection point of the first predetermined diagonal line and the second predetermined diagonal line is a point O; the predetermined connection lines connecting the midpoints of the four edges include a first predetermined connection line, a second predetermined connection line, a third predetermined connection line, and a fourth predetermined connection line, the first predetermined connection line is parallel and opposite to the fourth predetermined connection line, the second predetermined connection line is parallel and opposite to the third predetermined connection line; the first predetermined connection line is a connection line between a midpoint L of an upper edge of the predetermined wiring pattern and a midpoint of a left edge of the predetermined wiring pattern, an intersection point of the third predetermined line and the second predetermined diagonal line is a point P, and an intersection point of the fourth predetermined line and the first predetermined diagonal line is a point Q; and the first hollow pattern comprises a first broken line LP, a second broken line OP, and a third broken line OQ.

The beneficial effect of the present disclosure is that providing a plurality of connection wires distributed in a first direction misaligned in a second direction in each of the touch electrode repetition units, which can avoid regular arrangement of the connection wires is too concentrated in a certain direction, thereby solving a problem of a local area of the touch display panel forming a visible light spot, to improve display effect of the touch display panel.

BRIEF DESCRIPTION OF THE SEVERAL VIEWS OF THE DRAWINGS

To explain technical solutions in embodiments of the present disclosure more clearly, drawings needed to describe the embodiments will be briefly introduced as follows. Obviously, the drawings in the following description are only some embodiments of the present disclosure. Other drawings can be obtained according to these drawings without creative work for those skilled in the art.

DESCRIPTION OF SPECIFIC EMBODIMENTS OF THE INVENTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments in the present disclosure, all other embodiments obtained by those skilled in the art without creative work shall fall within the protection scope of the present disclosure.

The present disclosure provides a touch display panel that includes a touch electrode wiring layer and a signal transmission wiring layer. The touch electrode wiring layer includes a plurality of touch electrode repetition units. Each of the touch electrode repetition units includes a plurality of touch sub-units and a plurality of connection wires. The plurality of touch sub-units includes a part of the plurality of touch sub-units extending in a first direction and a part of the plurality of touch sub-units extending in a second direction. Two adjacent columns of the touch sub-units extending in the second direction are electrically connected via connection wires. The signal transmission wiring layer includes a plurality of signal transmission wires extending in the second direction. An orthographic projection of the signal transmission wire on the touch electrode wiring layer is located between two adjacent columns of the touch sub-units. The orthographic projection of the signal transmission wire on the touch electrode wiring layer at least partially overlaps with the connection wires. The plurality of connection wires arranged in the first direction are disposed in a misaligned manner in the second direction.

When the touch sub-units in the touch electrode repetition unit are arranged in an array manner, a first direction X is a row direction of the plurality of touch sub-units. A second direction Y is a column direction of the plurality of touch sub-units.

Figure 1:
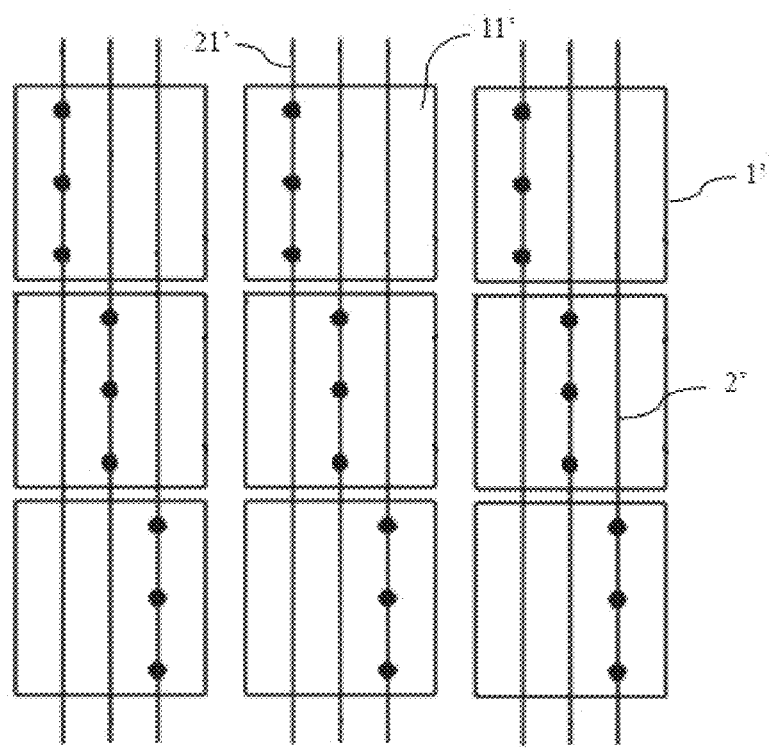
FIG. 1 is a schematic diagram of a structure of a touch display panel in the prior art.
Figure 2:
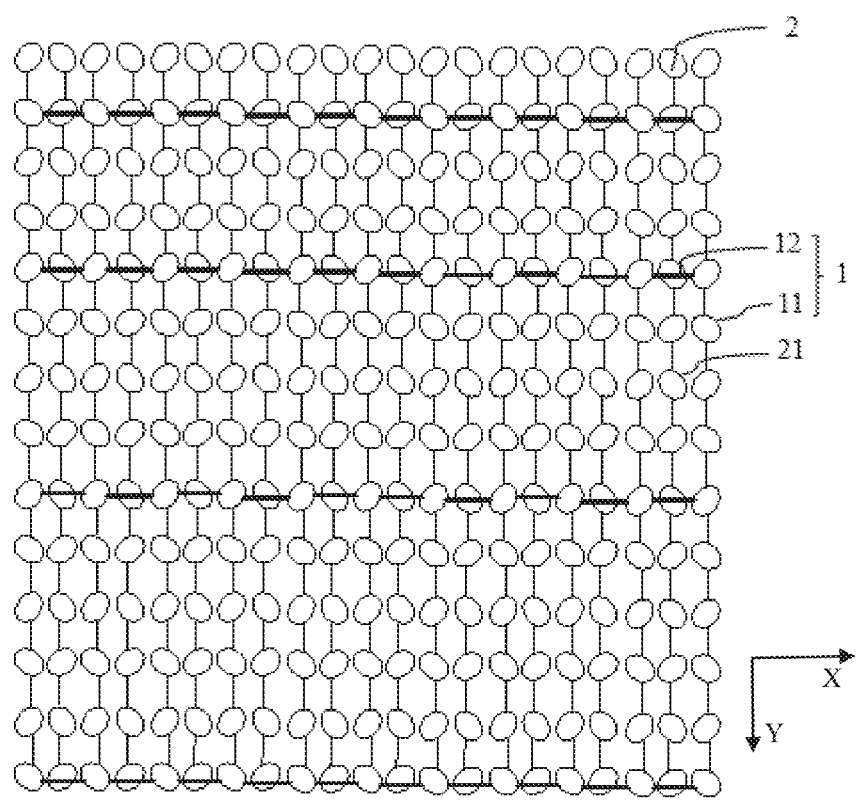
FIG. 2 is a schematic diagram of a structure of a touch display panel provided by a first embodiment of the present disclosure.
Figure 3:
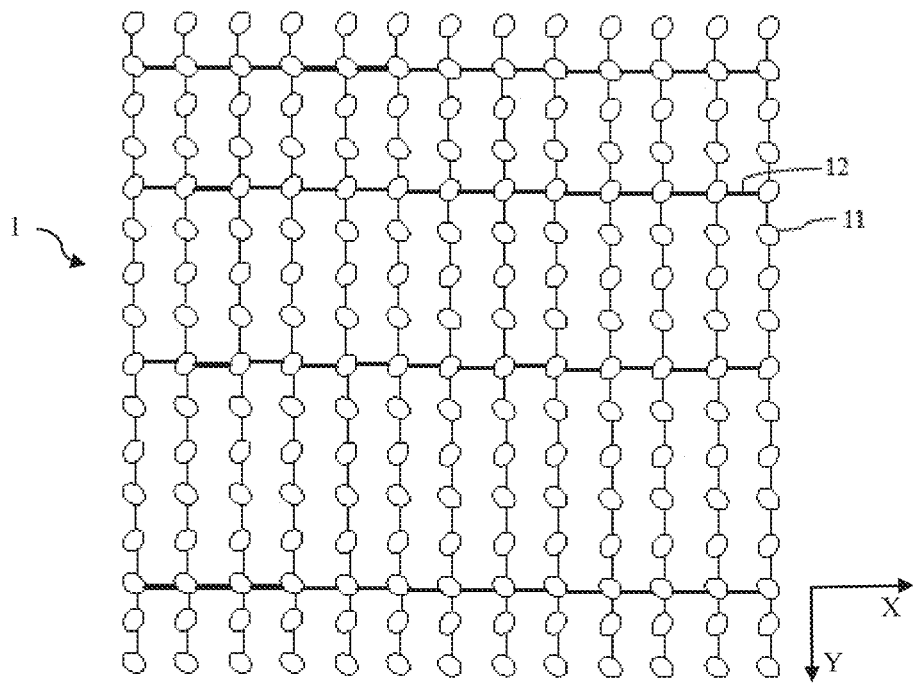
FIG. 3 is a schematic diagram of a structure of a touch electrode wiring layer in FIG. 2.
Figure 4:
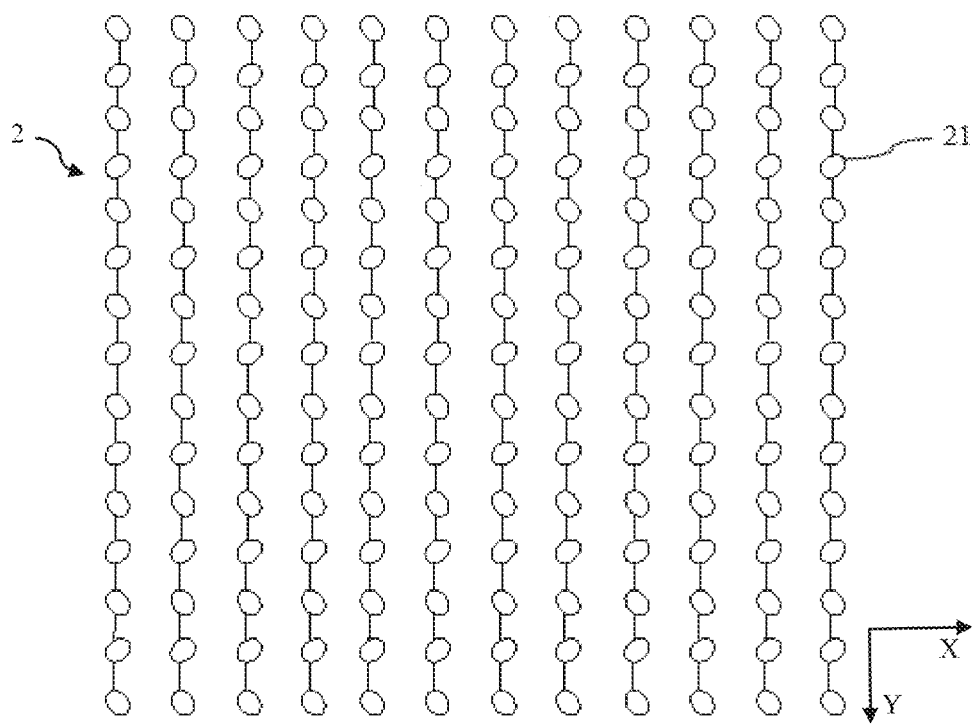
FIG. 4 is a schematic diagram of a structure of a signal transmission wiring layer in FIG. 2.

A first embodiment:

The first embodiment provided by the present disclosure is shown in FIGS. 2 to 4. The first embodiment provides a touch display panel that includes a touch electrode wiring layer 1 and a signal transmission wiring layer 2.

The touch electrode wiring layer 1 includes a plurality of touch sub-units 11 arranged in an array manner. Each touch sub-unit 11 has a hollow ring electrode pattern. The touch sub-units 11 located in a same column are connected to each other to complete transmission of touch signals in the column direction. The touch sub-units 11 located in a same row are electrically connected via connection wires 12 to complete transmission of touch signals in the row direction. In this embodiment, the connection wires 12 are arranged in the same row, that is, a plurality of adjacent connection wires 12 are located in the same row, to simplify a wiring pattern of the touch electrode wiring layer 1 and reduce difficulty of preparation.

The signal transmission wiring layer 2 includes a plurality of signal transmission wires 21 extending in the second direction Y. The signal transmission wires 21 includes a plurality of hollow ring electrode patterns connected to each other in the second direction Y. The hollow ring electrode patterns of the signal transmission wires 21 and the hollow ring electrode patterns of the touch sub-unit 11 are arranged in the same row. Namely, the hollow ring electrode pattern of each signal transmission wire 21 and the hollow ring electrode patterns of the plurality of touch sub-units 11 are located in the same row. An orthographic projection of each signal transmission wire 21 on the touch electrode wiring layer 1 is located between two adjacent rows of the touch sub-units 11. The orthographic projection of each signal transmission wire 21 on the touch electrode wiring layer 1 overlaps with one of the connection wires 12.

The touch display panel further includes an insulation layer (not shown in the figure) between the touch electrode wiring layer 1 and the signal transmission wiring layer 2. The signal transmission wires 21 and the connection wires 12 are electrically connected within an overlapping region through a plurality of via holes (not shown in the figure) formed on the insulation layer to complete the transmission of the touch signals for a target touch sub-unit. In some specific embodiments of the present disclosure, the hollow ring electrode patterns of the signal transmission wires 21 realize multi-point electrical connection with the connection wires 12 through the plurality of via holes to reduce touch failure caused by disconnection and improve touch reliability of the touch display panel.

The signal transmission wires 21 and the touch sub-units 11 are disposed in a misaligned manner. Namely, an orthographic projection of each signal transmission wire 21 on the touch electrode wiring layer 1 does not overlaps with two adjacent columns of the touch sub-units 11. The present structure can minimize areas where the signal transmission wires 21 overlap with the touch sub-units 11. At the same time, a parasitic capacitance between a target signal transmission wire and other surrounding touch sub-units and a parasitic capacitance formed between a target touch sub-unit and other signal transmission wires can be reduced, thereby improving touch performance and experience of the touch display panel.

There are multiple rows of the touch sub-units 11 distributed between two adjacent rows of the connection wires 12. Moreover, the multiple rows of the touch sub-units 11 are not directly connected to each other in the row direction. This structure can reduce the number of connection wires 12 under a case of ensuring target touch accuracy, thereby reducing the areas of the connection wires 12 overlapped with the signal transmission wires 21, to reduce the parasitic capacitances between the signal transmission wires 21 and the connection wires 12, and to improve the touch performance and experience of the touch display panel. In this embodiment, the touch sub-units 11 distributed between two adjacent rows of connection wires 12 can be two, three, or four rows, and a specific number can be adjusted adaptively according to requirements of touch accuracy. It can be understood that in other specific embodiments of the present disclosure, the number of rows of the touch sub-units 11 distributed between two adjacent rows of connection wires 12 may also be a fixed value, and the specific number is determined according to the touch accuracy, which is not limited herein.

It can be understood that each of the touch sub-units 11 and the signal transmission wires 21 may include the hollow ring electrode pattern shown in the figure or may be a grid-like electrode pattern surrounded by straight-line segments, which is not specifically limited herein.

This embodiment not only reduces parasitic capacitances of the touch display panel, but also has a very simple wiring pattern, which can reduce difficulty of preparation.

Figure 5:
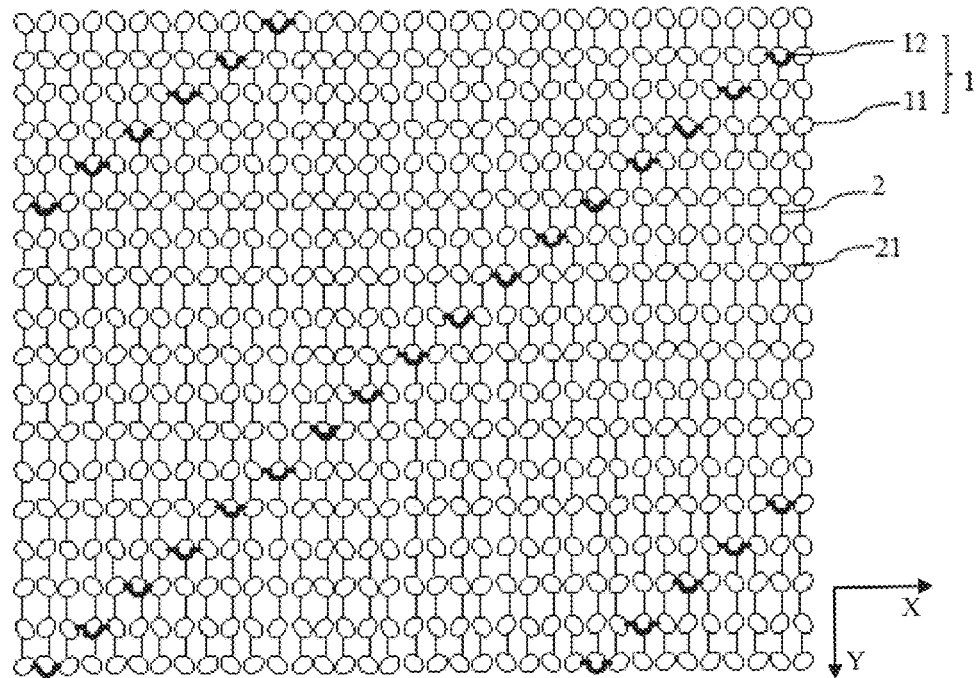
FIG. 5 is a schematic diagram of a structure of a touch display panel provided by a second embodiment of the present disclosure.
Figure 6:
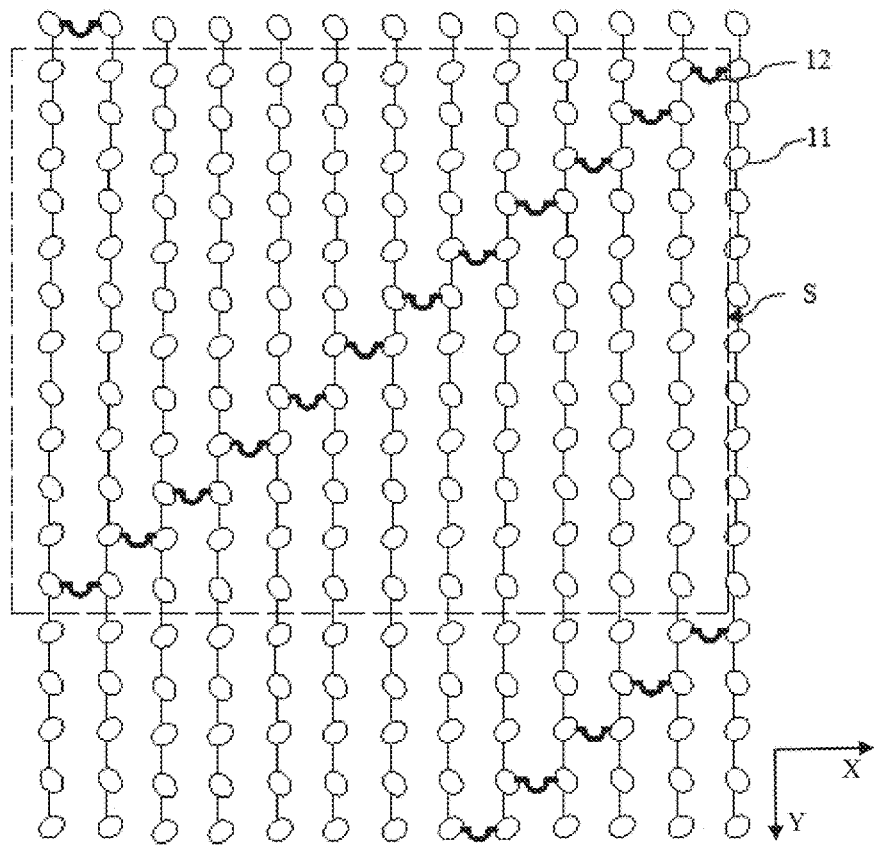
FIG. 6 is a schematic diagram of a structure of a touch electrode wiring layer in FIG. 5.

A Second embodiment:

The second embodiment provided by the present disclosure is shown in FIGS. 5 and 6. The touch display panel provided by this embodiment includes a touch electrode wiring layer 1 and a signal transmission wiring layer 2. A specific structure of the signal transmission wiring layer 2 is the same as the first embodiment and will not be repeatedly described here.

The touch electrode wiring layer 1 includes a plurality of touch sub-units 11 arranged in an array manner. Each touch sub-unit 11 has a hollow ring electrode pattern. The touch sub-units 11 located in a same column are connected to each other to complete transmission of touch signals in the column direction. The touch sub-units 11 located in two adjacent columns are electrically connected via connection wires 12 to complete transmission of touch signals in the row direction.

An orthographic projection of each signal transmission wire 21 on the touch electrode wiring layer 1 is located between two adjacent rows of the touch sub-units 11. The orthographic projection of each signal transmission wire 21 on the touch electrode wiring layer 1 overlaps with one of the connection wires 12.

The touch display panel further includes an insulation layer (not shown in the figure) provided between the touch electrode wiring layer 1 and the signal transmission wiring layer 2. The signal transmission wires 21 and the connection wires 12 are electrically connected within an overlapping region through a plurality of via holes (not shown in the figure) formed on the insulation layer, to complete the transmission of the touch signals of a target touch sub-unit. In some specific embodiments of the present disclosure, the hollow ring electrode patterns of the signal transmission wires 21 realize multi-point electrical connection with the connection wires 12 through the plurality of via holes, to reduce touch failure caused by disconnection and improve touch reliability of the touch display panel.

The signal transmission wires 21 and the touch sub-unit 11 are disposed in a misaligned manner. Namely, the orthographic projection of each signal transmission wire 21 on the touch electrode wiring layer 1 does not overlaps with two adjacent columns of the touch sub-units 11. The present structure can minimize areas where the signal transmission wires 21 overlap with the touch sub-units 11. At the same time, a parasitic capacitance between a target signal transmission wire and other surrounding touch sub-units and a parasitic capacitance formed between a target touch sub-unit and other signal transmission wires can be reduced, thereby improving touch performance and experience of the touch display panel.

Different from the first embodiment, in this embodiment, two adjacent connection wires 12 in the row direction are disposed in a misaligned manner. Specifically, as shown in FIG. 6, the touch electrode wiring layer 1 includes a plurality of touch electrode repetition units S arranged in an array manner. Each touch electrode repetition unit S includes a plurality of touch sub-units 11 arranged in an array manner. A plurality of connection wires 12 in the touch electrode repetition unit S are located in different rows. The connection wire 12 is generally made of metal. The plurality of connection wires 12 adjacent in the row direction are regularly arranged in the same row. The plurality of connection wires 12 will reflect light entering and exiting the touch display panel. It is easy to form visible light spots in the local area of the touch display panel, affecting the display effect of the touch display panel. In this embodiment, although a pattern of the touch electrode wiring layer 1 obtained by arranging the plurality of the touch electrode repetition units S in the array manner is more complicated than that of the first embodiment, it can avoid a regular arrangement of the connection wires 12 too concentrated in the row direction, thereby solving a problem of visible light spots formed in a partial area of the touch display panel, to improve the display effect of the touch display panel.

In this embodiment, the plurality of connection wires 12 in the touch electrode repetition unit S are distributed in a stepped manner. As shown in FIG. 6, positions of the connection wires 12 in the touch electrode repetition unit S rise sequentially from left to right. Each row of touch sub-units 11 has only one connection wire 12 in each touch electrode repetition unit S, which minimizes concentration of connection wires 12 in the row direction. It avoids a centralized arrangement of the metal connection wires 12 to reflect light affecting the display effect.

Spacing between two adjacent rows of the connection wires 12 in the touch electrode repetition unit S is the same, so that the plurality of connection wires 12 are evenly misaligned in the column direction to form the stepped distribution pattern. Each row of touch sub-units 11 is provided with one connection wire 12 in one touch electrode repetition unit S, which can improve the accuracy of touch control. It is understandable that, in other embodiments of the present disclosure, in the same touch electrode repetition unit S, there may also be multiple rows of the touch sub-units 11 distributed between two adjacent connection wires 12 in the column direction. The multiple rows of the touch sub-units 11 are not directly connected to each other in the row direction. The concentration of the connection wires 12 is further reduced in a case of ensuring the target touch accuracy, which not only reduces the areas where the connection wires 12 overlaps with the signal transmission wires 21 and reduces the parasitic capacitances between the signal transmission wires 21 and the connection wires 12 can further reduce the visible light spot phenomenon caused by the centralized arrangement of the connection wires 12. The number of rows of the touch sub-units 11 distributed between two adjacent connection wires 12 in the column direction may be a fixed value or a variable number. A specific number is determined according to the touch accuracy, which is not specifically limited herein.

In addition, each of the connection wires 12 has an arc and/or a corner. A bending design of the connection wire 12 can further reduce the concentration of the connection wire 12 in the row direction, thereby solving a problem of the visible light spot formed in the partial area of the touch display panel and further improving the display effect of the touch display panel.

It can be understood that in other embodiments of the present disclosure, each of the touch sub-units 11 and the signal transmission wires 21 may include the hollow ring electrode pattern shown in the figure, or may be a grid-like electrode pattern surrounded by straight-line segments, which is not specifically limited herein.

Figure 7:
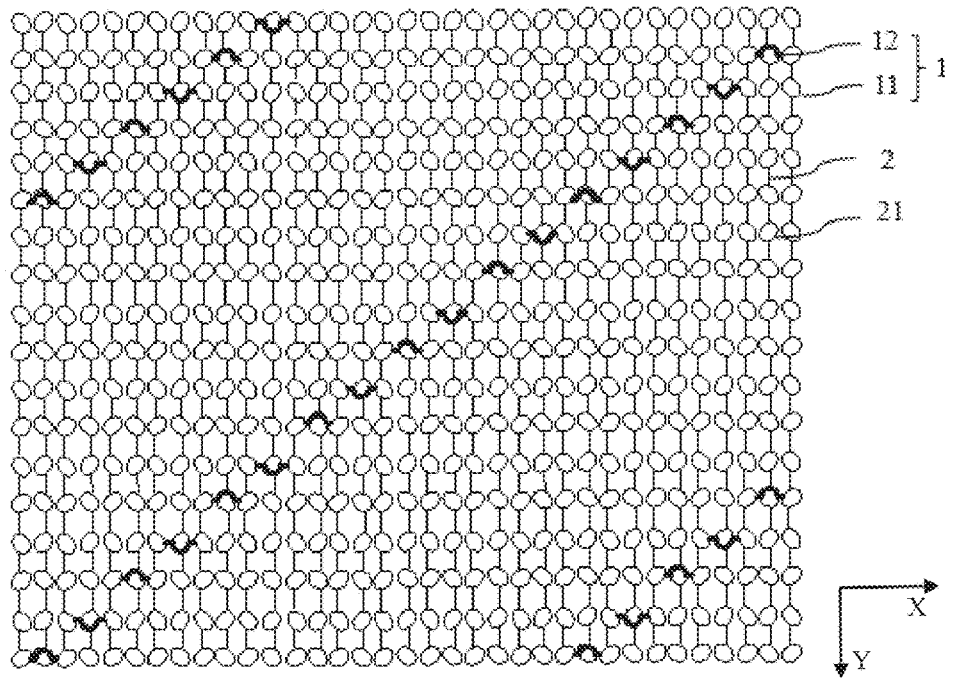
FIG. 7 is a schematic diagram of a structure of a touch display panel provided by a third embodiment of the present disclosure.
Figure 8:
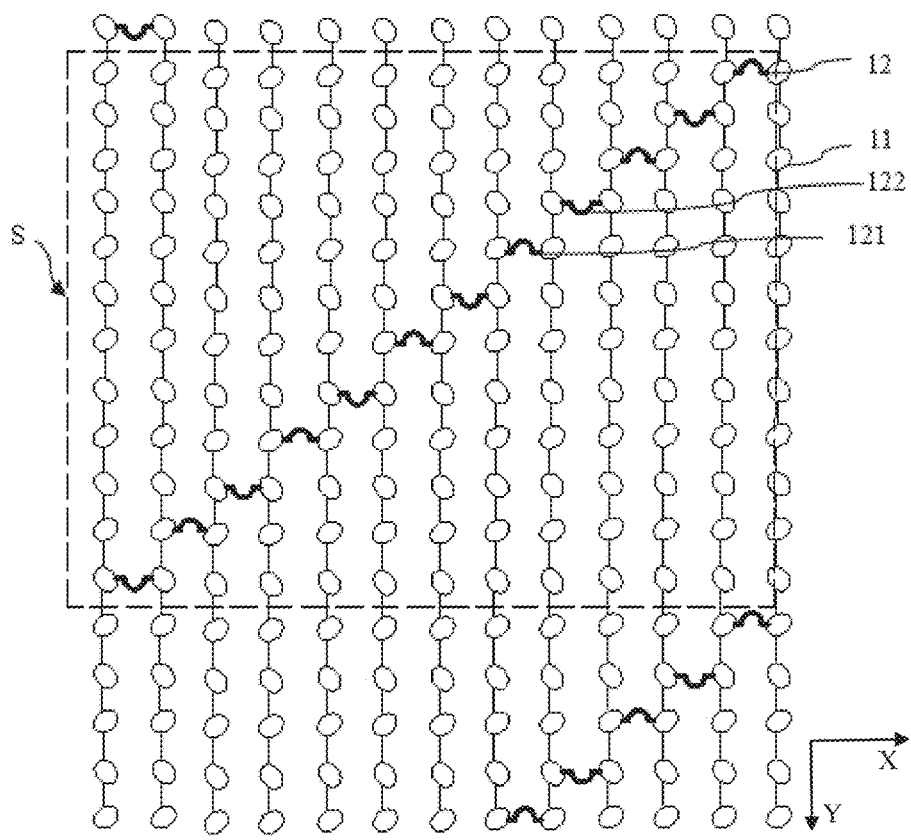
FIG. 8 is a schematic diagram of a structure of a touch electrode wiring layer in FIG. 7.

A third embodiment:

The third embodiment provided by the present disclosure is shown in FIGS. 7 and 8, the touch display panel includes a touch electrode wiring layer 1 and a signal transmission wiring layer 2. The relevant specific structure and design of the signal transmission wiring layer 2 are the same as the second embodiment and will not be repeatedly described here.

The touch electrode wiring layer 1 includes a plurality of touch sub-units 11 arranged in an array manner. Each touch sub-unit 11 has a hollow ring electrode pattern. The touch sub-units 11 located in a same column are connected to each other to complete transmission of touch signals in the column direction. The touch sub-units 11 located in two adjacent columns are electrically connected via connection wires 12 to complete transmission of touch signals in the row direction. Each of the connection wires 12 has an arc and/or a corner. A bending design of the connection wire 12 can reduce the concentration of the connection wires 12 in the row direction, thereby alleviating a problem of visible light spots formed in a local area of the touch display panel.

Different from the second embodiment, an orientation of the arc or the corner of one connection wire 12 in this embodiment is opposite to an orientation of the arc or the corner of another connection wire 12 adjacent to the connection wire 12 in this embodiment, to further reduce the concentration of the connection wire 12 in the row direction, avoid the formation of visible light spots, thereby improving the display effect of the touch display panel.

Specifically combined with FIG. 8, the touch electrode wiring layer 1 includes a plurality of touch electrode repetition units S arranged in an array manner. The touch electrode repetition unit S includes a plurality of touch sub-units 11 arranged in an array manner. The multiple connection wires 12 in the touch electrode repetition unit S are located in different rows and are distributed in a stepped manner. As shown in FIG. 6, positions of the connection wires 12 in the touch electrode repetition unit S rises sequentially from left to right. There is only one connection wire 12 within each row of touch sub-units 11 in each touch electrode repetition unit S, which minimizes the concentration of the connection wires 12 in the row direction and avoids the metal connection wires 12 from being concentrated to cause the light reflection affecting the display effect.

The first connection wire 121 and the second connection wire 122 are adjacent in the row direction. The first connection wires 121 has a downward arc. The second connection wires 122 has an upward arc. The arcs of the first connection wire 121 and the second connection wire 122 have opposite directions. It is understandable that the first connection wires 121 and the second connection wires 122 may also be a pattern of corners with opposite directions composed of straight-line segments or be a combination of patterns of corners and arcs with opposite directions, which is not specifically limited here.

Spacing between two adjacent rows of connection wires 12 in the touch electrode repetition unit S is the same, so that the plurality of connection wires 12 are evenly misaligned in the column direction to form the stepped distribution pattern. Each row of touch sub-units 11 is provided with one connection wire 12 in one touch electrode repetition unit S, which can improve the accuracy of touch control. It is understandable that, in other embodiments of the present disclosure, in the same touch electrode repetition unit S, there may also be multiple rows of the touch sub-units 11 distributed between two adjacent connection wires 12 in the column direction. In addition, the multi-row touch sub-units 11 are not directly connected to each other in the row direction. The concentration of the connection wires 12 is further reduced in a case of ensuring the target touch accuracy, which not only reduces the areas where the connection wires 12 overlaps with the signal transmission wires 21 and reduces the parasitic capacitances between the signal transmission wires 21 and the connection wires 12 can further reduce the visible light spot phenomenon caused by the centralized arrangement of the connection wires 12. The number of rows of the touch sub-units 11 distributed between two adjacent connection wires 12 in the column direction may be a fixed value or a variable number. A specific number is determined according to the touch accuracy, which is not specifically limited herein.

It can be understood that in other embodiments of the present disclosure, each of the touch sub-units 11 and the signal transmission wires 21 may include the hollow ring electrode pattern shown in the figure, or may be a grid-like electrode pattern surrounded by straight-line segments, which is not specifically limited herein.

Figure 9:
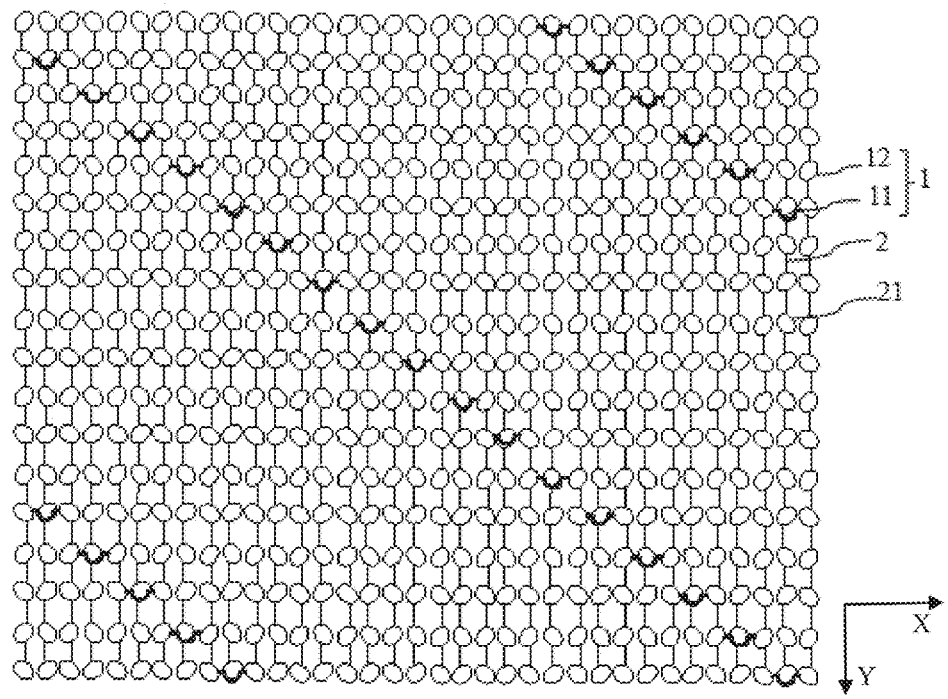
FIG. 9 is a schematic diagram of a structure of a touch display panel provided by a fourth embodiment of the present disclosure.
Figure 10:
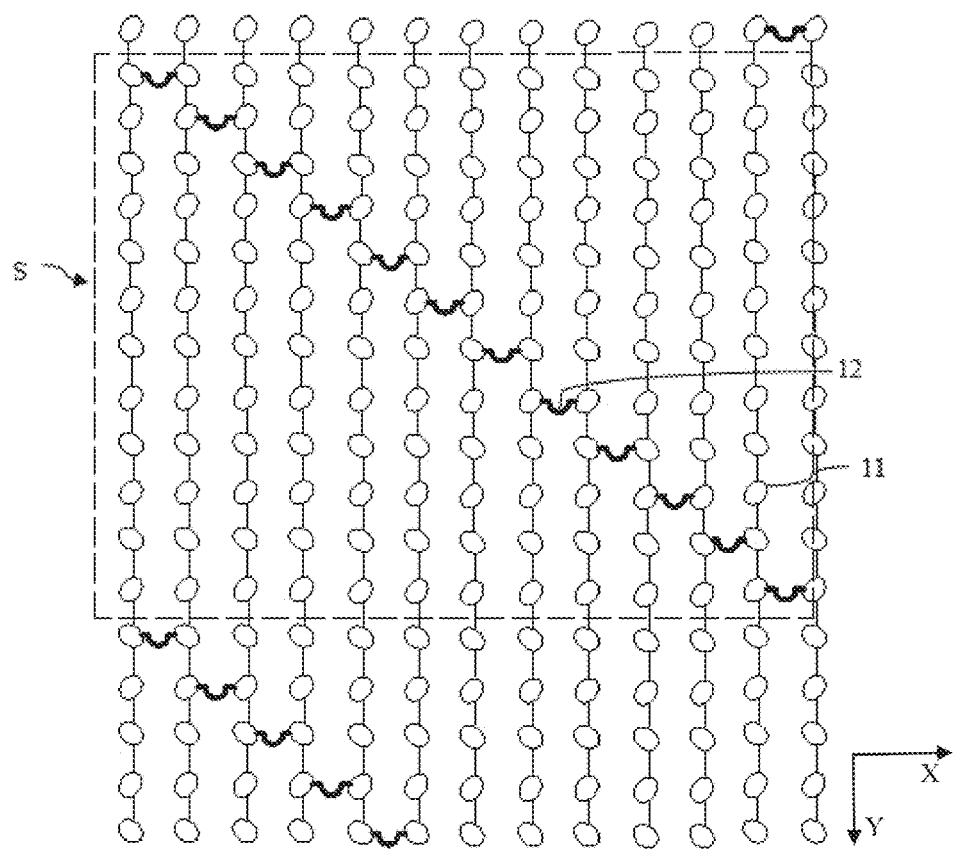
FIG. 10 is a schematic diagram of a structure of a touch electrode wiring layer in FIG. 9.

A fourth embodiment:

The fourth embodiment provided by the present disclosure is shown in FIGS. 9 and 10, the touch display panel includes a touch electrode wiring layer 1 and a signal transmission wiring layer 2 that are insulated from each other. The relevant specific structure and design of the signal transmission wiring layer 2 are the same as the second embodiment and will not be repeatedly described here.

The difference between the touch electrode wiring layer 1 of this embodiment and that of the second embodiment is that the positions of the connection wires 12 in the touch electrode repetition unit S are sequentially lowered from left to right. In this embodiment, there is also only one connection wire 12 within each row of touch sub-units 11 in each touch electrode repetition unit S, which can also minimize the concentration of the connection wires 12 in the row direction and avoid the metal connection wires 12 from being concentrated to cause the light reflection affecting the display effect.

Figure 11:
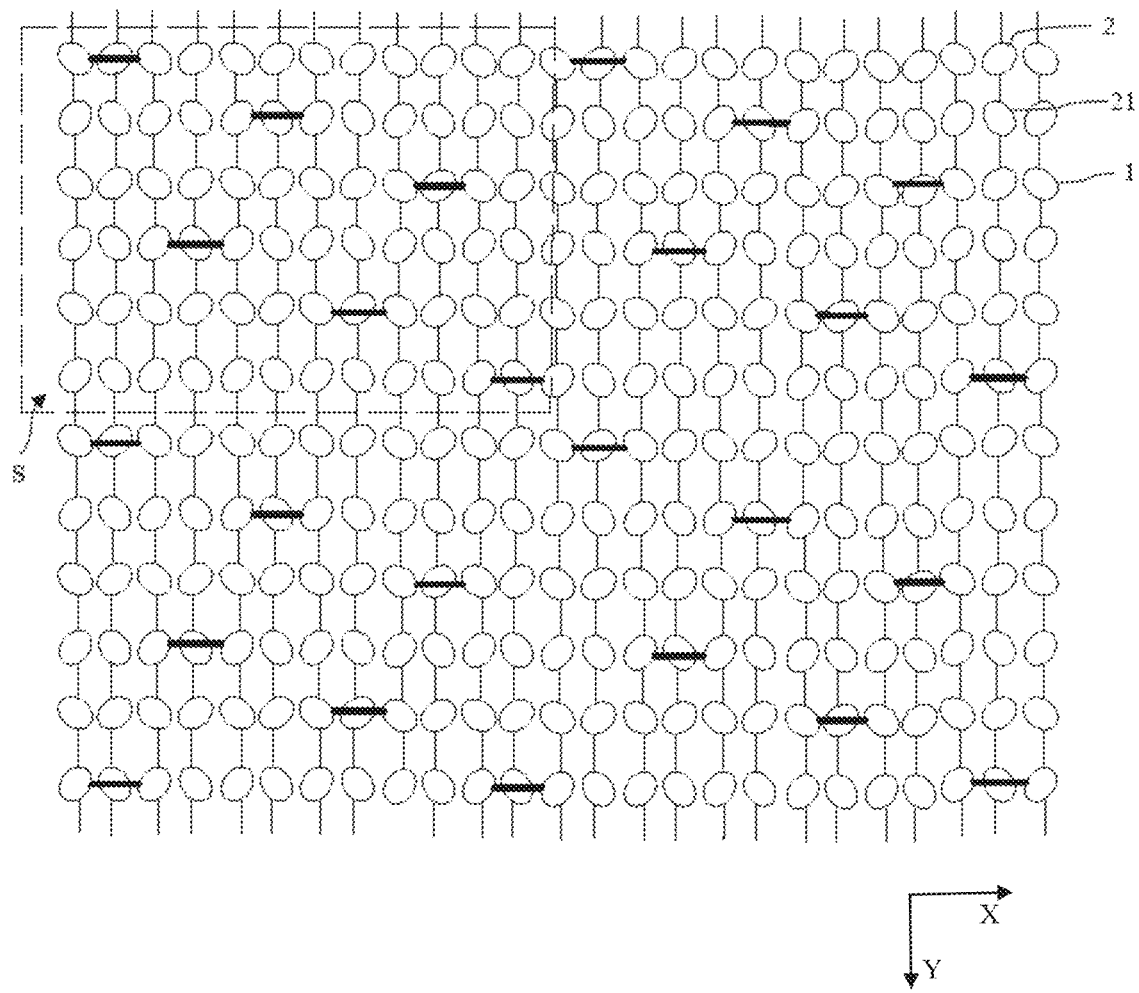
FIG. 11 is a schematic diagram of a structure of a touch display panel provided by a fifth embodiment of the present disclosure.
Figure 12:
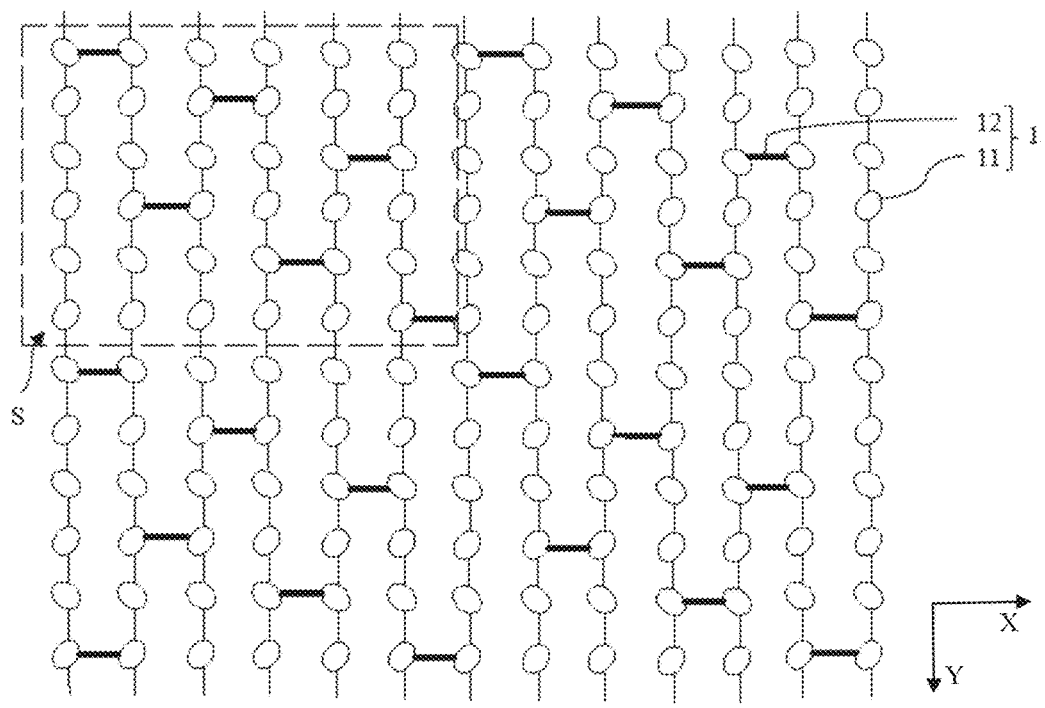
FIG. 12 is a schematic diagram of a structure of a touch electrode wiring layer in FIG. 11.
Figure 13:
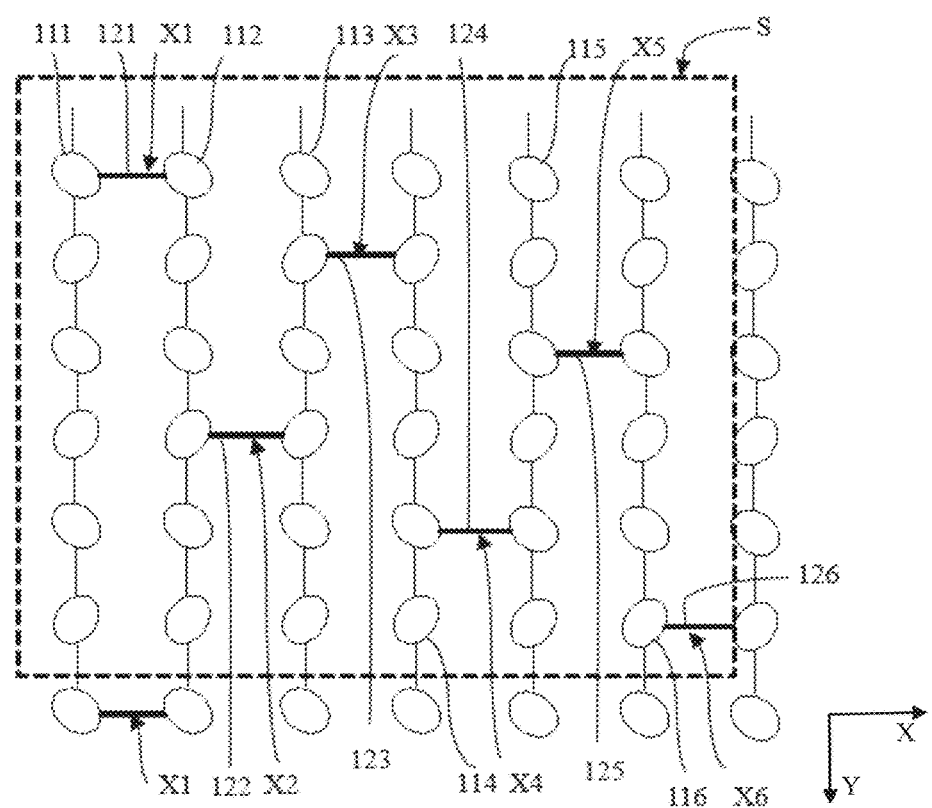
FIG. 13 is a schematic diagram of a structure of a touch electrode repetition unit in FIG. 12.

A fifth embodiment:

The fifth embodiment provided by the present disclosure is shown in FIGS. 11 to 13, the touch display panel includes a touch electrode wiring layer 1 and a signal transmission wiring layer 2. A specific structure of the signal transmission wiring layer 2 is the same as the first embodiment and will not be repeatedly described here.

The touch electrode wiring layer 1 includes a plurality of touch sub-units 11 arranged in an array manner. Each touch sub-unit 11 has a hollow ring electrode pattern. The touch sub-units 11 located in a same column are connected to each other to complete transmission of touch signals in the column direction. The touch sub-units 11 located in two adjacent columns are electrically connected via connection wires 12 to complete transmission of touch signals in the row direction.

An orthographic projection of the signal transmission wires 21 on the touch electrode wiring layer 1 is located between two adjacent rows of the touch sub-units 11. The orthographic projection of the signal transmission wires 21 on the touch electrode wiring layer 1 overlaps with one of the connection wires 12.

The touch display panel further includes an insulation layer (not shown in the figure) between the touch electrode wiring layer 1 and the signal transmission wiring layer 2. The signal transmission wires 21 and the connection wires 12 are electrically connected within an overlapping region through a plurality of via holes (not shown in the figure) formed on the insulation layer, to complete the transmission of the touch signals of a target touch sub-unit. In some specific embodiments of the present disclosure, the hollow ring electrode pattern of the signal transmission wires 21 realizes multi-point electrical connection with the connection wires 12 through a plurality of via holes, to reduce the touch failure caused by the process interruption line and improve the touch display. The touch reliability of the panel. When the signal transmission wires 21 and the connection wires 12 are connected by a plurality of via holes, two adjacent via holes in the row direction are disposed in a misaligned manner in the column direction to further improve the touch reliability of the touch display panel.

The signal transmission wires 21 and the touch sub-unit 11 are disposed in a misaligned manner. Namely, the orthographic projection of the signal transmission wires 21 on the touch electrode wiring layer 1 does not overlaps with the two adjacent columns of the touch sub-units 11. The present structure can minimize areas where the signal transmission wires 21 overlap with the touch sub-units 11; meanwhile, reduce the parasitic capacitance between the target signal transmission wire and other surrounding touch electrodes, and the parasitic capacitance formed between the target touch sub-unit and other signal transmission wires, to improve the touch performance and experience of the touch display panel.

Different from the second embodiment, in this embodiment, the plurality of connection wires 12 adjacent to each other in the row direction are distributed in a misaligned manner. Specifically, as shown in FIG. 6, the touch electrode wiring layer 1 includes a plurality of touch electrode repetition units S arranged in an array manner. The touch electrode repetition unit S includes a plurality of touch sub-units 11 arranged in an array manner. The multiple connection wires 12 in the touch electrode repetition unit S are distributed in a misaligned manner. The multiple connection wires 12 in the touch electrode repetition unit S are located in different rows.

In order to improve the touch performance of the touch display panel, it should be ensured that the number of connection wires 12 connected to each column of touch sub-units 11 is as same as possible, and the connection wires 12 are distributed as evenly as possible in the column direction. The specific number of connection wires 12 connected to each column of touch sub-units 11 is not limited. A position on the right side of each row of touch sub-units 11 for connecting with the connection wires 12 is taken as a connection position of the row of touch sub-units 11. In one touch electrode repetition unit S in this embodiment, each row of touch sub-units 11 has only one connection position. The number of connection wires 12 in the touch electrode repetition unit S is a fixed value X. According to the actual size and distribution of the touch sub-units 11 in the touch display panel, a value of X can be increased or decreased accordingly.

With reference to FIG. 12, the touch electrode repetition unit S includes X columns of the touch sub-units 11 and X connection wires 12. There are totally X connection positions in the touch electrode repetition unit S. The position in the column direction of the first connection wire 121 connected to the first column of touch sub-units 111 in the touch electrode repetition unit S is taken as the initial connection position X1 of the touch electrode repetition unit S. The length of the touch electrode repetition unit S in the column direction is determined to obtain other initial connection positions X1 of the first column of touch sub-units 111 on the entire touch electrode wiring layer 1. The connection position X2 of the second row of touch electrodes in the touch electrode repetition unit S is located in the intermediate position in the column direction between two adjacent initial connection positions X1 in the column direction. The second connection wire 122 is connected to the second row of touch sub-units 112 at the connection position X2 of the second row of touch electrodes. One of the initial connection positions X1 is located in another touch electrode repeat unit S adjacent to the touch electrode repeat unit S in the column direction. The connection positions of the remaining (X-2) connection wires 12 in the touch electrode repetition unit S are determined by the following steps:

Step B1: Determining whether the connection position of the (x)th connection wire connected to the (x)th column of touch sub-units has been determined ($2 < x \leq X$, x is an integer). Ending if the connection position has been determined. Performing step B2 if the connection position is not determined.

Step B2: Selecting, arbitrarily, two connection positions among the determined connection positions and the two adjacent initial connection positions X1, to perform step B3.

Step B3: Determining whether an intermediate position in the column direction between the two selected connection positions is located on one row of touch sub-units or between two adjacent rows of the touch sub-units. Performing step B4 if the intermediate position is located on the one row of touch sub-units. Performing step B5 if the intermediate position is located between two adjacent rows of the touch sub-units.

When the intermediate position is located on the one row of touch sub-units, indicating that the number of rows of the touch sub-units between the two selected connection positions is odd, and the row of touch sub-units is the target row of touch sub-units, which can be used to determine whether the connection position is valid directly. When the intermediate position is located between the two adjacent rows of the touch sub-units, indicating that the number of rows of the touch sub-units between the two selected connection positions is even, it is necessary to select one row of touch control units whose connection positions are valid to serve as the target row of touch sub-unit.

Step B4: Determining whether the one row of touch sub-units has been provided with connection wires. Re-performing step B2 if the one row of touch sub-units has been provided with connection wires. Using the one row of touch sub-units as the target row corresponding to the intermediate position to perform step S6 if the one row of touch sub-units has not been provided with connection wires.

By step B4, which can determine whether the target row of touch sub-units has a valid connection position. If the target row of touch sub-units has no connection wire, it is determined that the target row of touch sub-units has a valid connection position.

Step B5: Determining whether the two adjacent rows of the touch sub-units have been provided with connection wires. Re-performing step B2 if each of the two adjacent rows of the touch sub-units has been provided with connection wires. Selecting one row of touch sub-units as the target row of touch sub-units corresponding to the intermediate position to perform step B6 if each of the two adjacent rows of the touch sub-units is not provided with connection wires. Using the one row of touch sub-units as the target row of touch sub-units corresponding to the intermediate position to perform step B6 if only one of the two adjacent rows of the touch sub-units is not provided with connection wires.

Selecting one row of touch sub-units with effective connection positions as the target row of touch sub-units if the intermediate position is located between two adjacent rows of the touch sub-units. Selecting any one of the two adjacent rows of the touch sub-units as the target row of touch sub-units if both rows of the touch sub-units have valid connection positions.

Step B6: Configuring the (x)th connection wire connected to the (x)th column touch sub-unit on the target row of touch sub-units corresponding to the intermediate position. The connection position of the (x)th column of touch sub-units in the touch electrode repetition unit S is located on the target row touch sub-unit corresponding to the intermediate position.

Specifically, as shown in FIG. 13, the touch electrode repetition unit S includes six columns of the touch sub-units 11. Each column of touch sub-units 11 includes six rows of the touch sub-units 11 and 6 connection wires 12. There are correspondingly six connection positions in the touch electrode repetition unit S. The determination method of these six connection positions is described as follows:

Determining the connection position of the first column of touch sub-units 111 as an initial connection position X1 located on the first row of touch sub-units 11. A first connection wire 121 is connected to the first column of touch sub-units 111 at the initial connection position X1.

The connection position X2 of the second column of touch sub-units is located at an intermediate position in the column direction between two adjacent initial connection positions X1 in the column direction. A second connection wire 122 is connected to the second column of touch sub-units 112 at the connection position X2 of the second column of touch sub-units. One of the initial connection positions X1 is located in another touch electrode repeat unit S adjacent to the touch electrode repeat unit S in the column direction.

The connection position X3 of the third column of touch sub-units is located at an intermediate position in the column direction between the initial connection position X1 and the connection position X2 of the second row of touch sub-units. The third connection wire 123 is connected to the third row of touch sub-units 113 at the connection position X3 of the third row of touch sub-units.

The connection position X4 of the fourth row of touch sub-units is located in an intermediate position of the column direction between the initial connection position X1 of another touch electrode repetition unit S adjacent in the column direction and the connection position X2 of the second row of touch sub-units. A fourth connection wire 124 is connected to the fourth row of touch sub-units 114 at the connection position X4 of the fourth row of touch sub-units.

The connection position X5 of the fifth column of touch sub-units is located in an intermediate position in the column direction between the connection position X3 of the third column of touch sub-units and the connection position X4 of the fourth column of touch sub-units. The fifth connection wire 125 is connected to the fifth row of touch sub-units 115 at the connection position X5 of the fifth row of touch sub-units.

The connection position X6 of the sixth row of touch sub-units is located at an intermediate position in the column direction between the initial connection position X1 of another adjacent touch electrode repetition unit S and the connection position X4 of the fourth row of touch sub-units. A sixth connection wire 126 is connected to the sixth row of touch sub-units 116 at the connection position X6 of the sixth row of touch sub-units.

By the six connection positions obtained by the above method, the pattern of the touch electrode repetition unit S can be determined to include: the touch sub-unit 11 located in the first row of the first column is connected to the first connection wire 121. The touch sub-unit 11 located in the fourth row of the second column is connected to the second connection wire 122. The touch sub-unit 11 located in the second row of the third column is connected to the third connection wire 123. The touch sub-unit 11 located in the fifth row of the fourth column is connected to the fourth connection wire 124. The touch sub-unit 11 located in the third row of the fifth column is connected to the fifth connection wire 125. The touch sub-unit 11 located in the sixth row of the sixth column is connected to the sixth connection wire 126.

It can be understood that in other embodiments of the present disclosure, each of the touch sub-units 11 and the signal transmission wires 21 may include the hollow ring electrode pattern shown in the figure, or may be a grid-like electrode pattern surrounded by straight-line segments, which is not specifically limited herein.

A display area of the touch display panel also includes a plurality of pixels (not shown in the figure). Each pixel has a light-transmitting region or a light-emitting region. It can be understood that the orthographic projection of the connection wire 12 on the touch display panel should not overlap or overlap as little as possible with the light-transmitting region or the light-emitting region, to reduce the influence of the touch structure on the aperture ratio of the touch display panel.

A plurality of the touch electrode repetition units S are arranged in an array to obtain the pattern of the touch electrode wiring layer 1. The pattern of the touch electrode wiring layer 1 obtained in this embodiment can avoid the regular arrangement of the connection wires 12 in the row direction that is too concentrated, thereby solving the problem of visible light spots formed in a local area of the touch display panel, and improving the display effect of the touch display panel.

In addition, the pattern of the touch electrode wiring layer 1 obtained in this embodiment can also ensure that the connection wires 12 are evenly distributed in the column direction and avoid the regular arrangement of the connection wires 12 in the column direction or other directions that are too concentrated to generate sight spot.

In the pattern of the touch electrode wiring layer 1 obtained in this embodiment, the number of connection wires 12 connected to the touch sub-units 11 in one column is one more or less than the number of connection wires 12 connected to the touch sub-units 11 in the other column, resulting in a different number of connection wires 12 overlapping with each signal transmission wire 21, causing the parasitic capacitance between the signal transmission wires 21 and the connection wires 12 to be a variable value, so that the number of touch signals cannot be completely evenly distributed. Certainly, for the entire touch display panel, a deviation of the parasitic capacitance caused by one or two connection wires 12 will not significantly affect the touch performance. The wiring pattern in the present disclosure can obtain a touch control structure in which touch signals with a relatively uniform distribution of touch signals.

A sixth embodiment:

The sixth embodiment provided by the present disclosure is shown in FIGS. 14 to 17, the touch display panel includes a touch electrode wiring layer 1 and a signal transmission wiring layer 2.

The touch electrode wiring layer 1 includes a plurality of touch sub-units 11 arranged in an array manner. Each touch sub-unit 11 is a grid-like electrode pattern surrounded by straight-line segments. The touch sub-units 11 located in a same column are connected to each other to complete transmission of touch signals in the column direction. The touch sub-units 11 located in a same row are electrically connected by the connection wire 12 to complete the transmission of touch signals in the row direction.

Figure 14:
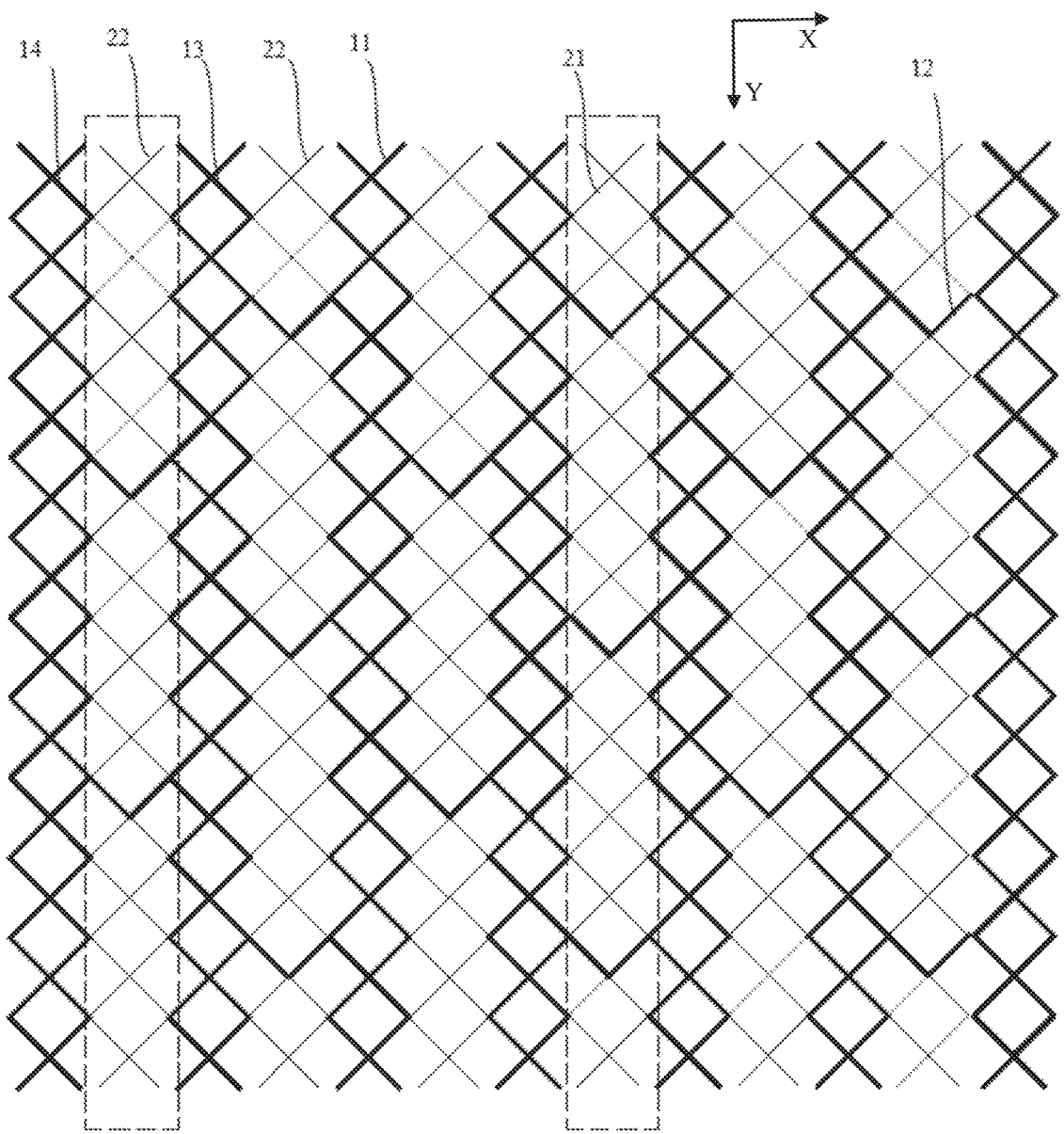
FIG. 14 is a schematic diagram of a partial structure of a touch display panel provided by a sixth embodiment of the present disclosure.

With reference to FIG. 14, the signal transmission wiring layer 2 includes a plurality of signal transmission wires 21 extending in the column direction. The signal transmission wire 21 is formed into a grid-like electrode pattern surrounded by straight-line segments. An orthographic projection of the signal transmission wires 21 on the touch electrode wiring layer 1 is located between two adjacent columns of the touch sub-units 11. The orthographic projection of each of the signal transmission wires 21 on the touch electrode wiring layer 1 overlaps with one of the connection wires 12.

The touch display panel further includes an insulation layer (not shown in the figure) between the touch electrode wiring layer 1 and the signal transmission wiring layer 2. The signal transmission wires 21 and the connection wires 12 are electrically connected within an overlapping region through a plurality of via holes (not shown in the figure) formed on the insulation layer, to complete the transmission of the touch signals of a target touch sub-unit. In some specific embodiments of the present disclosure, the signal transmission wires 21 realizes multi-point electrical connection with the connection wires 12 through a plurality of via holes, to reduce the touch failure caused by the process interruption line and improve the touch control of the touch display panel. reliability.

The signal transmission wires 21 and the touch sub-unit 11 are disposed in a misaligned manner. Namely, the orthographic projection of the signal transmission wires 21 on the touch electrode wiring layer 1 does not overlaps with the two adjacent columns of the touch sub-units 11. The present structure can minimize areas where the signal transmission wires 21 overlap with the touch sub-units 11. At the same time, a parasitic capacitance between a target signal transmission wire and other surrounding touch sub-units 11 and a parasitic capacitance formed between a target touch sub-unit and other signal transmission wires can be reduced, thereby improving touch performance and experience of the touch display panel.

Figure 15:
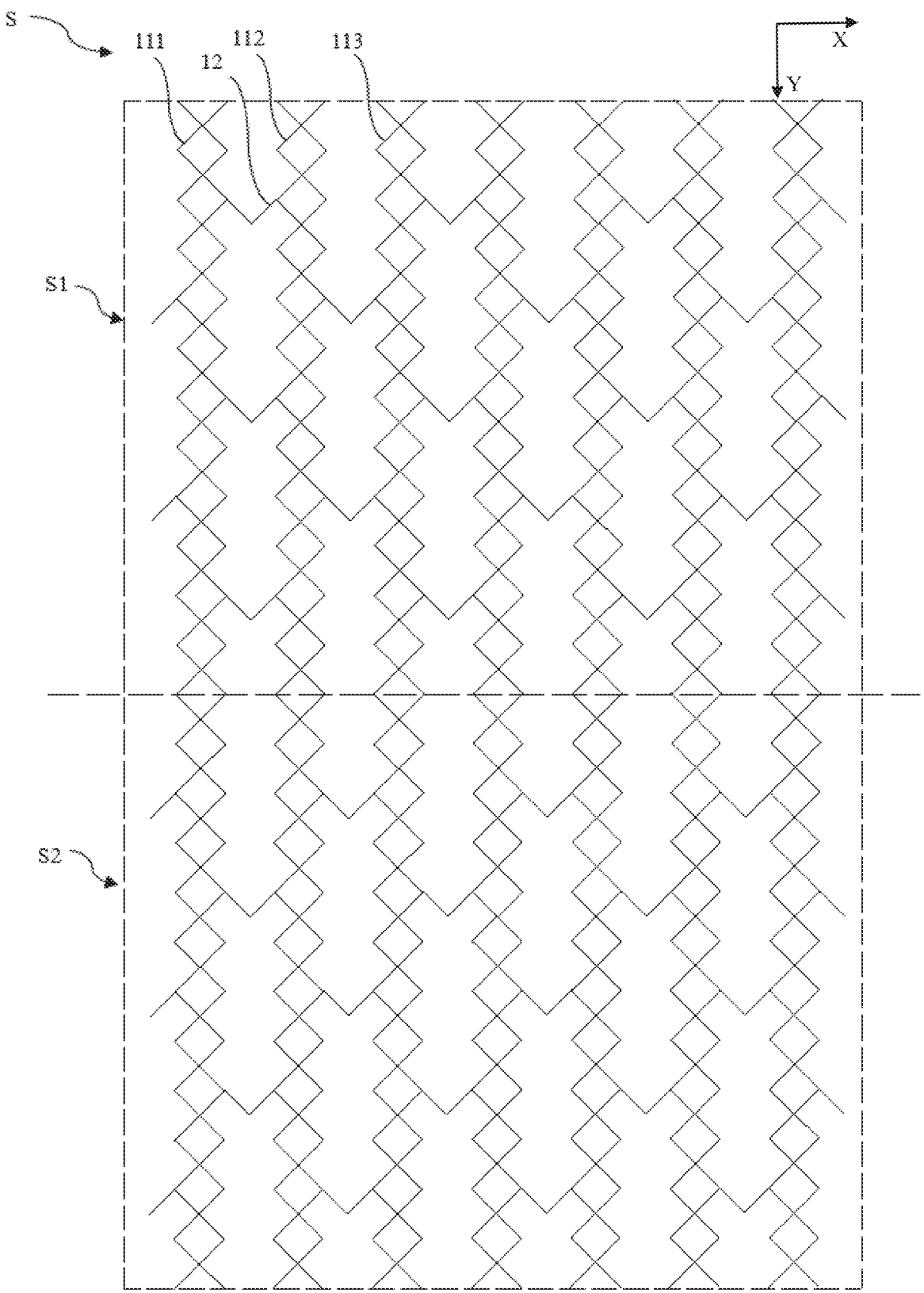
FIG. 15 is a schematic diagram of a structure of a touch electrode repetition unit in the touch display panel provided in FIG. 14.
Figure 16:
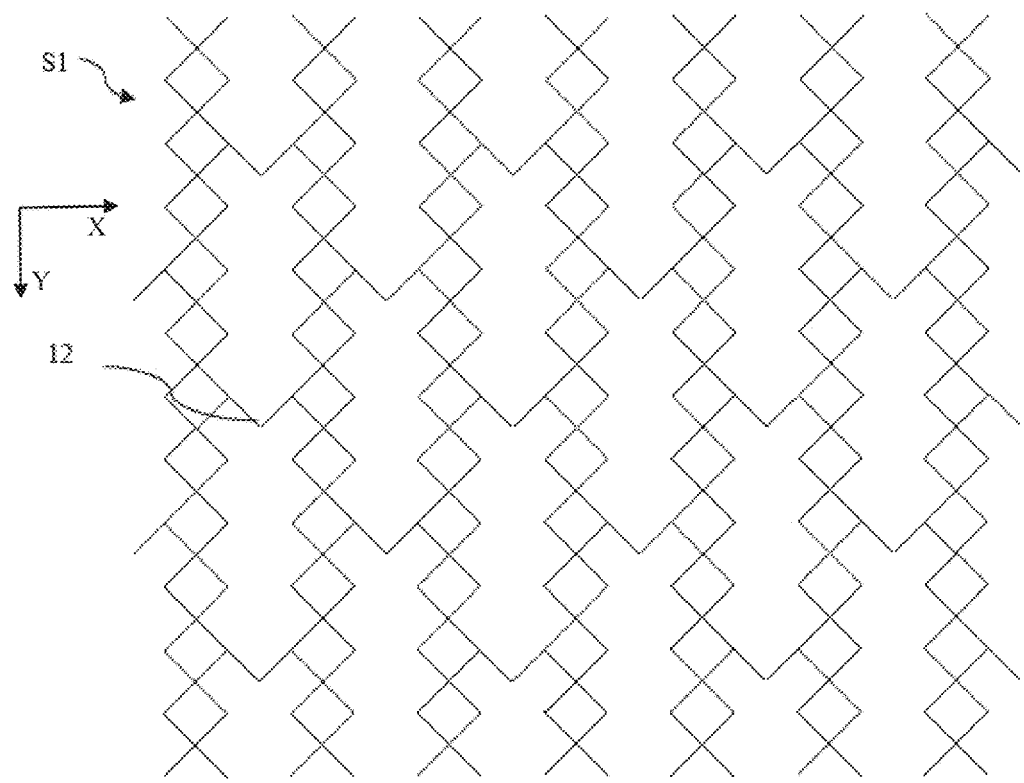
FIG. 16 is a schematic diagram of a structure of a first repetition sub-unit in FIG. 15.
Figure 17:
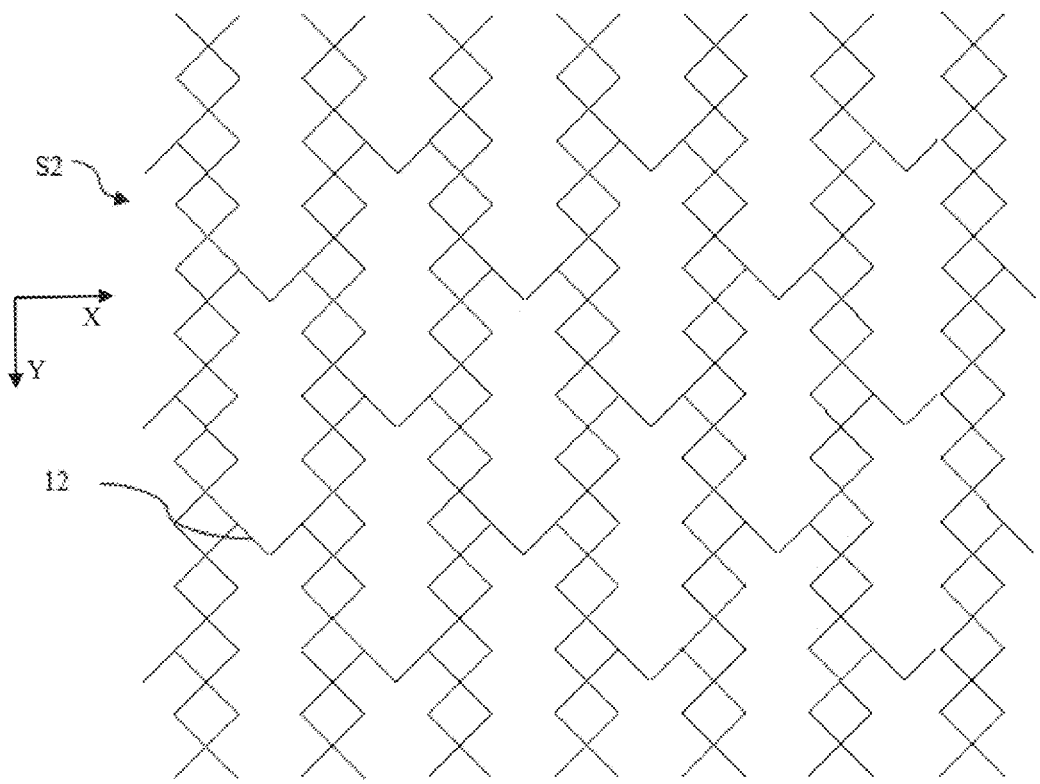
FIG. 17 is a schematic diagram of a structure of a second repetition sub-unit in FIG. 15.

As shown in FIG. 15, the touch electrode wiring layer 1 includes a plurality of touch electrode repetition units S arranged in an array manner. The touch electrode repetition unit S includes a plurality of touch sub-units 11 arranged in an array manner.

The touch electrode repetition unit S includes a first column of touch sub-units 111, a second column of touch sub-units 112, and a third column of touch sub-units 113. The second column of touch sub-units 112 is located between the first column of touch sub-units 111 and the third column of touch sub-units 113. The second column of touch sub-units 112 is arranged adjacent to the first column of touch sub-units 111 and the third column of touch sub-units 113. The first column of touch sub-units 111 and the second column of touch sub-units 112 are electrically connected via M connection wires 12. The second row of touch sub-units 112 and the third row of touch sub-units 113 are electrically connected via N connection wires 12. Both M and N are odd numbers. M and N are equal. Namely, the number of connection wires 12 in two adjacent columns is exactly the same to ensure that areas where each signal transmission wire 21 overlaps with all of the connection wires 12 in the touch electrode repetition unit S are equal. The areas where each signal transmission wire 21 overlaps with all of the connection wires 12 are a fixed value.

The touch electrode repetition unit S is divided into a first repetition sub-unit 51 and a second repetition sub-unit S2 in the column direction.

There are m1 connection wires between the first row of touch sub-units 111 and the second row of touch sub-units 112 located in the first repetition sub-unit 51. There are m2 connection wires between the first row of touch sub-units 111 and the second row of touch sub-units 112 located in the second repetition sub-unit S2. m1 is an odd number. m2 is an even number. A sum of m1 and m2 is M.

There are n1 connection wires between the second row of touch sub-units 112 and the third row of touch sub-units 113 located in the first repetition sub-unit 51. There are n2 connection wires between the second row of touch sub-units 112 and the third row of touch sub-units 113 located in the second repetition sub-unit S2. n1 is an even number. n2 is an odd number. A sum of n1 and n2 is N.

In the above design, the connection wires 12 are evenly distributed in the column direction of the touch electrode repetition unit S. The connection wires 12 divide the touch electrode repetition unit S into even-numbered parts that are evenly in the column direction.

Different from the fifth embodiment, in this embodiment, the number of connection wires 12 connected to each column of touch sub-units 11 on the touch electrode wiring layer 1 is the same and is a fixed value. Areas where an orthographic projection of each signal transmission wire 21 on the touch electrode wiring layer 1 overlaps with all of the connection wires 12 are equal. Namely, areas where the orthographic projection of each signal transmission wire 21 on the touch electrode wiring layer 1 overlaps with all of the connection wires 12 are a fixed value. By the above configurations, this embodiment can achieve the same parasitic capacitance between each signal transmission wire 21 and the connection wires 12, and ensure the uniform distribution of the touch signal amount on the touch display panel to the greatest extent, so as not to affect the touch control linearity.

There are multiple rows of the touch sub-units 11 distributed between two adjacent rows of connection wires 12. The multi-row touch sub-units 11 are not directly connected to each other in the row direction. The concentration of the connection wires 12 is further reduced in a case of ensuring the target touch accuracy, which not only reduces the areas where the connection wires 12 overlaps with the signal transmission wires 21 and reduces the parasitic capacitances between the signal transmission wires 21 and the connection wires 12 can further reduce the visible light spot phenomenon caused by the centralized arrangement of the connection wires 12. It can be understood that a specific number of rows of the touch sub-units 11 distributed between two adjacent connection wires 12 in the column direction is determined according to the touch accuracy, which is not specifically limited herein. In other embodiments of the present disclosure, each row of touch sub-units 11 may provide one connection wire 12 to improve touch accuracy.

In this embodiment, as shown in FIG. 14, the signal transmission wiring layer 2 further includes a plurality of redundant signal transmission wires 22 arranged in an edge region. A redundant compensation electrode pattern 13 is provided between two adjacent redundant signal transmission wires 22. The redundant compensation electrode pattern 13 is located on the touch electrode wiring layer 1. The redundant compensation electrode pattern 13 includes a plurality of redundant touch sub-units 14 arranged in the column direction. The redundant compensation electrode pattern 13 has a pattern the same as one row of touch sub-units 11 to ensure that the light transmittance of the touch display panel remains uniform.

In another embodiment of the present disclosure, the edge region of the touch electrode wiring layer 1 further includes a plurality of redundant touch sub-units 14 arranged in an array manner. A redundant compensation electrode pattern 13 is provided between the redundant touch sub-units 14 and the touch sub-units 11 adjacent to the redundant touch sub-units 14 in the row direction. The redundant compensation electrode pattern 13 is located on the signal transmission wiring layer 2. A redundant compensation electrode pattern 13 is also provided between two adjacent redundant touch sub-units 14 in the row direction. The redundant compensation electrode pattern 13 has a pattern the same as the signal transmission wires 21 to ensure that the light transmittance of the touch display panel remains uniform.

It can be understood that in other embodiments of the present disclosure, the touch sub-unit 11 and the signal transmission wires 21 may also be the aforementioned hollow ring electrode pattern, which is not specifically limited herein.

A seventh embodiment:

Different from the sixth embodiment, connection wires 12 in this embodiment divides the touch electrode repetition unit S into odd equal parts that are evenly in the column direction. A plurality of connection wires 12 are located in a same row.

Figure 18:
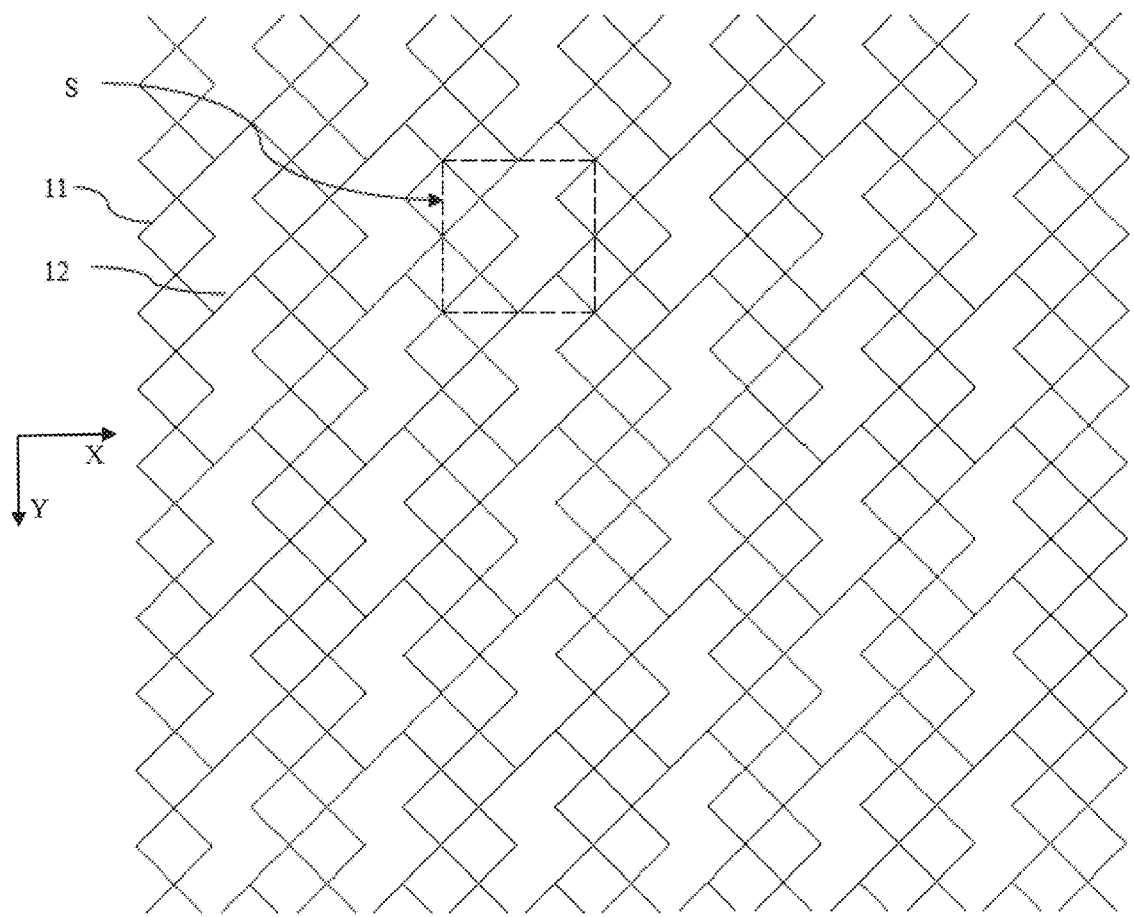
FIG. 18 is a schematic diagram of a structure of a touch electrode wiring layer in a touch display panel provided by a seventh embodiment of the present disclosure.
Figure 19:
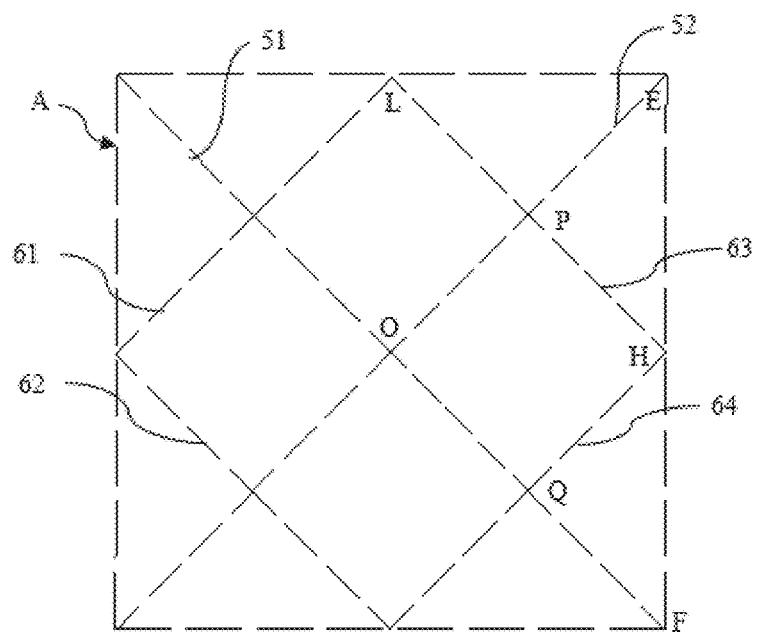
FIG. 19 is a schematic diagram of a predetermined wiring pattern of a touch electrode repetition unit in FIG. 18.
Figure 20:
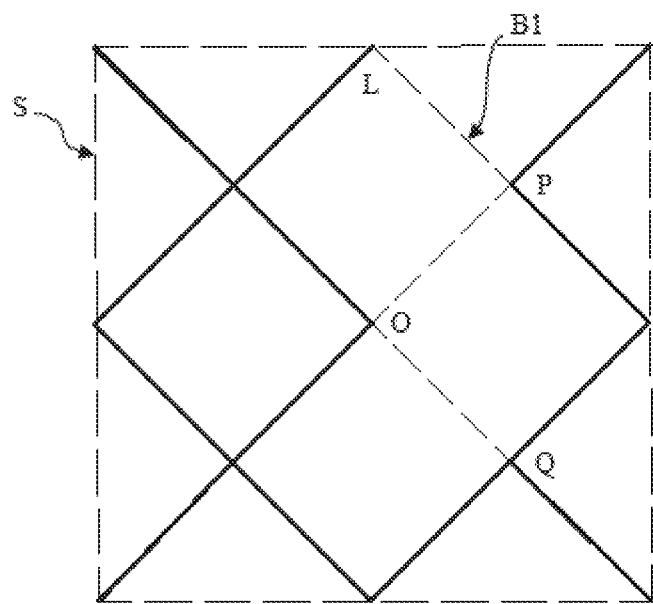
FIG. 20 is a schematic diagram of actual wiring of the touch electrode repetition unit in FIG. 18.

The seventh embodiment provided by the present disclosure is shown in FIGS. 18 to 20, the touch display panel includes a touch electrode wiring layer 1 and a signal transmission wiring layer 2. The related structure and design of the signal transmission wiring layer 2 are the same as the sixth embodiment and will not be repeatedly described here.

The touch electrode wiring layer 1 includes a plurality of touch sub-units 11 arranged in an array manner. Each touch sub-unit 11 is a grid-like electrode pattern surrounded by straight-line segments. The touch sub-units 11 located in a same column are connected to each other to complete transmission of touch signals in the column direction. The touch sub-units 11 located in a same row are electrically connected by the connection wire 12 to complete transmission of touch signals in the row direction.

As shown in FIG. 18, the touch electrode wiring layer 1 includes a plurality of touch electrode repetition units S arranged in an array manner. Each touch electrode repetition unit S includes a plurality of touch sub-units 11 arranged in an array manner. The touch electrode repetition unit S has a grid-like rectangular predetermined wiring pattern A, as shown in FIG. 19. The predetermined wiring pattern A includes two predetermined diagonal lines and predetermined connection lines connecting four midpoints of four edges.

The touch electrode repetition unit S is provided with a hollow pattern B based on the predetermined wiring pattern A. The hollow pattern B in each touch electrode repetition unit S is composed of multiple broken lines.

The plurality of touch sub-units 11 and the plurality of connection wires 12 on the touch electrode wiring layer 1 enclose to form a plurality of hollow areas B. The hollow areas B are evenly distributed in the column direction between two adjacent columns of the touch sub-units 11 to ensure that the number of connection wires 12 connected to each column of touch sub-units 11 on the touch electrode wiring layer 1 is the same and is a fixed value. Areas where an orthographic projection of each signal transmission wire 21 on the touch electrode wiring layer 1 overlaps with all of the connection wires 12 are equal. The areas where the orthographic projection of each signal transmission wire 21 on the touch electrode wiring layer 1 overlaps with all of the connection wires 12 are a fixed value. By the above configuration, this embodiment can achieve the same parasitic capacitance between each signal transmission wire 21 and the connection wires 12, and ensure the uniform distribution of the touch signal amount on the touch display panel to the greatest extent, so as not to affect the touch control linearity.

In this embodiment, the touch electrode repetition unit S is provided with a first hollow pattern B1 based on the predetermined wiring pattern A. In conjunction with FIGS. 19 and 20, it can be determined that the first hollow pattern B1 is composed of three broken lines.

The two diagonal lines are a first predetermined diagonal line 51 and a second predetermined diagonal line 52. An intersection point of the first predetermined diagonal line 51 and the second predetermined diagonal line 52 is located at a point 0.

The predetermined connection lines connecting the midpoints of the four edges include a first predetermined connection line 61, a second predetermined connection line 62, a third predetermined connection line 63, and a fourth predetermined connection line 64. The first predetermined connection line 61 and the fourth predetermined connection line 64 are parallel and opposite to each other. The second predetermined connection line 62 and the third predetermined connection line 63 are parallel and opposite to each other. The first predetermined connection line 61 is a connection between a midpoint L of an upper edge of the predetermined wiring pattern A and a midpoint of a left edge of the predetermined wiring pattern A. An intersection point of the third predetermined connection line 63 and the second predetermined diagonal line 52 is a point P. An intersection point of the fourth predetermined connection line 64 and the first predetermined diagonal line 51 is a point Q.

As shown in FIG. 20, comparing the actual wiring diagram of the touch electrode repetition unit S with the predetermined wiring pattern A, it can be seen that the first hollow pattern B1 includes a first broken line LP, a second broken line OP, and a third broken line OQ.

An eighth embodiment:

Different from the seventh embodiment, a hollow pattern B in this embodiment is composed of four broken lines.

Figure 21:
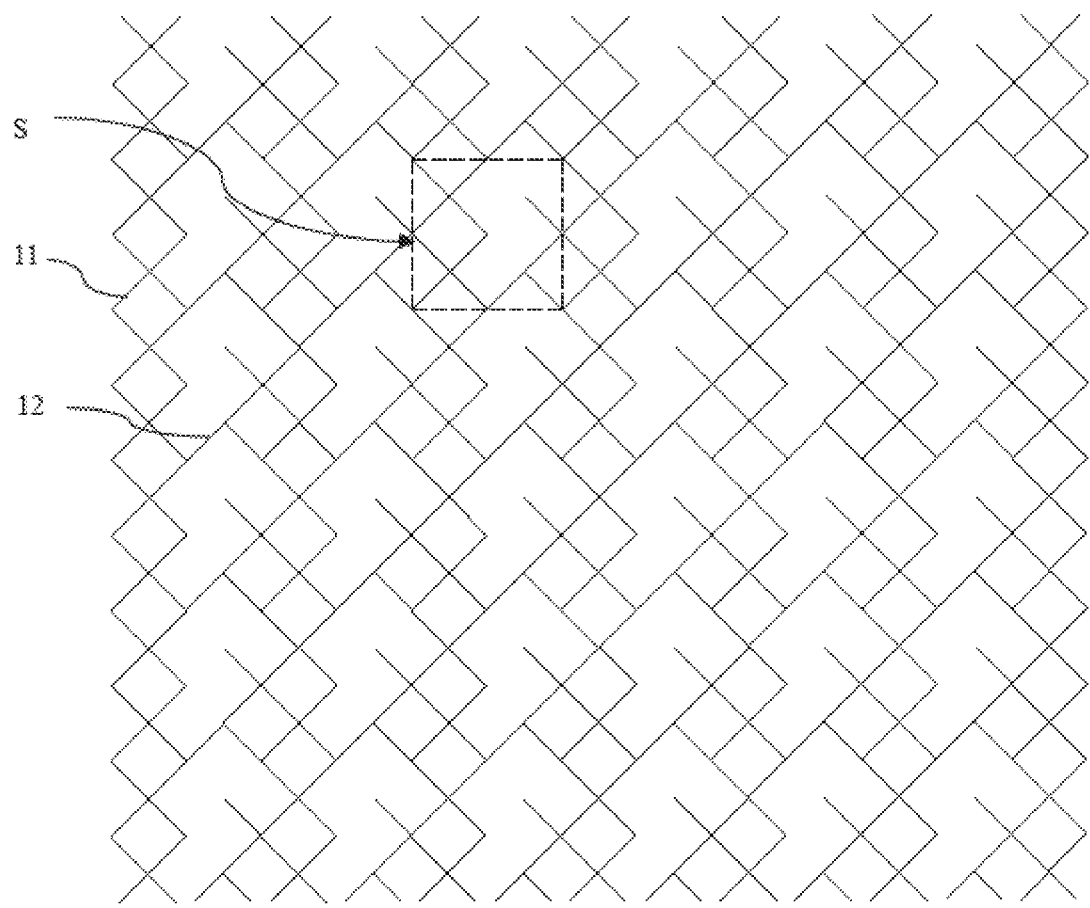
FIG. 21 is a schematic diagram of a structure of a touch electrode wiring layer in the touch display panel provided by an eighth embodiment of the present disclosure.
Figure 22:
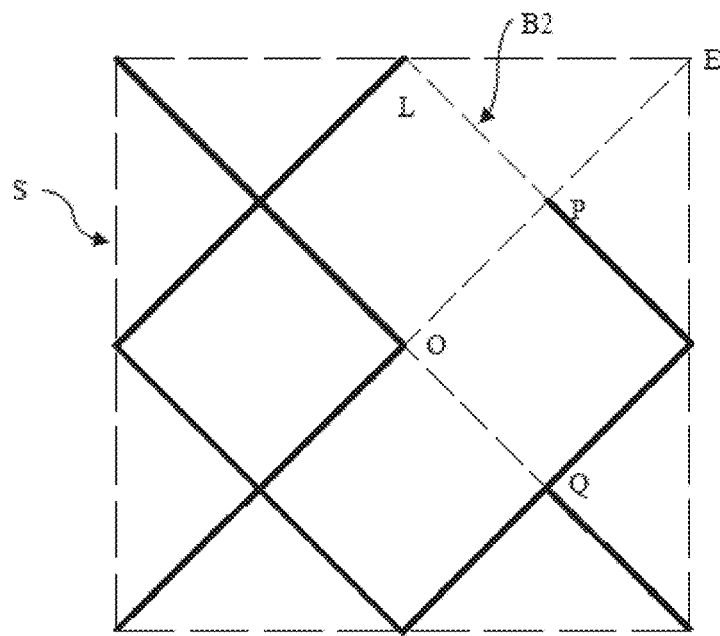
FIG. 22 is a schematic diagram of actual wiring of a touch electrode repetition unit in FIG. 21.

The eighth embodiment provided by the present disclosure is shown in FIGS. 21 to 22. The touch display panel includes a touch electrode wiring layer 1 and a signal transmission wiring layer 2. The related structure and design of the signal transmission wiring layer 2 are the same as the sixth embodiment and will not be repeatedly described here.

The touch electrode wiring layer 1 includes a plurality of touch sub-units 11 arranged in an array manner. Each touch sub-unit 11 is a grid-like electrode pattern surrounded by straight-line segments. The touch sub-units 11 located in a same column are connected to each other to complete transmission of touch signals in the column direction. The touch sub-units 11 located in a same row are electrically connected by the connection wire 12 to complete the transmission of touch signals in the row direction.

As shown in FIG. 21, the touch electrode wiring layer 1 includes a plurality of touch electrode repetition units S arranged in an array manner. The touch electrode repetition unit S includes a plurality of touch sub-units 11 arranged in an array manner. The touch electrode repetition unit S has a grid-like rectangular predetermined wiring pattern A, as shown in FIG. 19. The predetermined wiring pattern A includes two predetermined diagonal lines and predetermined connection lines connecting four midpoints of the four edges.

In this embodiment, the touch electrode repetition unit S is provided with a second hollow pattern B2 based on the predetermined wiring pattern A. In combination with FIGS. 19 and 22, it can be determined that the second hollow pattern B2 is composed of four broken lines.

The two diagonal lines are the first predetermined diagonal line 51 and the second predetermined diagonal line 52. An intersection point of the first predetermined diagonal line 51 and the second predetermined diagonal line 52 is a point 0. The second predetermined diagonal line 52 connects an upper-right vertex E and a lower-left vertex of the predetermined wiring pattern A.

The predetermined connection lines connecting the midpoints of the four edges include a first predetermined connection line 61, a second predetermined connection line 62, a third predetermined connection line 63, and a fourth predetermined connection line 64. The first predetermined connection line 61 and the fourth predetermined connection line 64 are parallel and opposite to each other. The second predetermined connection line 62 and the third predetermined connection line 63 are parallel and opposite to each other. The first predetermined connection line 61 is a connection line between a midpoint L of an upper edge of the predetermined wiring pattern A and a midpoint of a left edge of the predetermined wiring pattern A. An intersection point of the third predetermined connection line 63 and the second predetermined diagonal line 52 is a point P. An intersection point of the fourth predetermined connection lines 64 and the first predetermined diagonal line 51 is a point Q.

As shown in FIG. 22, comparing the actual wiring diagram of the touch electrode repetition unit S with the predetermined wiring pattern A, it can be seen that the second hollow pattern B2 includes a first broken line LP, a second broken line OP, a third broken line OQ, and a four broken line PE.

A second hollow area B2 in this embodiment is evenly distributed in the column direction between two adjacent columns of the touch sub-units 11. It is ensured that the number of connection wires 12 connected to each column of touch sub-units 11 on the touch electrode wiring layer 1 is the same and is a fixed value. Areas where an orthographic projection of each signal transmission wire 21 on the touch electrode wiring layer 1 overlaps with all of the connection wires 12 are equal. Namely, the areas where the orthographic projection of each signal transmission wire 21 on the touch electrode wiring layer 1 overlaps with all of connection wires 12 are a fixed value. By the above configuration, this embodiment can achieve the same parasitic capacitance between each signal transmission wire 21 and the connection wires 12, and ensure the uniform distribution of the touch signal amount on the touch display panel to the greatest extent, so as not to affect the touch control linearity.

In addition, the number of broken lines included in a second hollow area B2 in this embodiment is greater than the number of broken lines included in a first hollow area B 1. Therefore, the parasitic capacitance between the signal transmission wires 21 and the connection wires 12 overlapping the second hollow area B2 is smaller, which is beneficial to the improvement of the touch performance of the touch display panel.

A ninth embodiment:

Different from the seventh embodiment, a hollow pattern B in this embodiment is composed of six broken lines.

Figure 23:
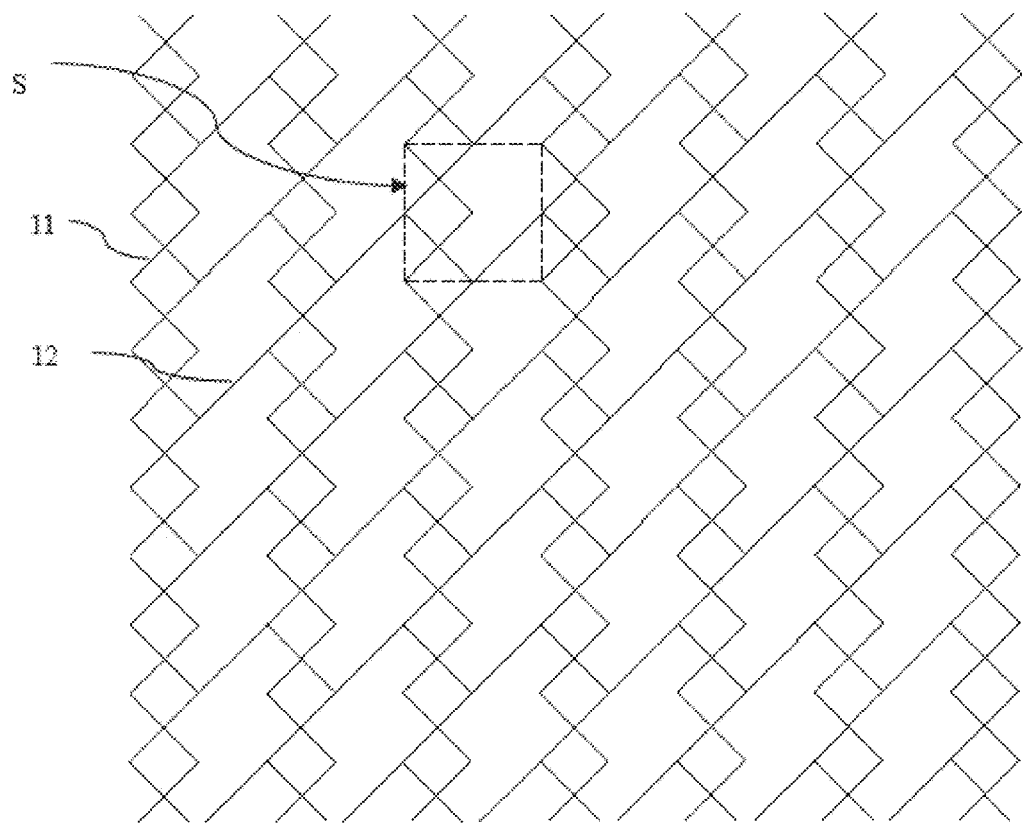
FIG. 23 is a schematic diagram of a structure of a touch electrode wiring layer in a touch display panel provided by a ninth embodiment of the present disclosure.
Figure 24:
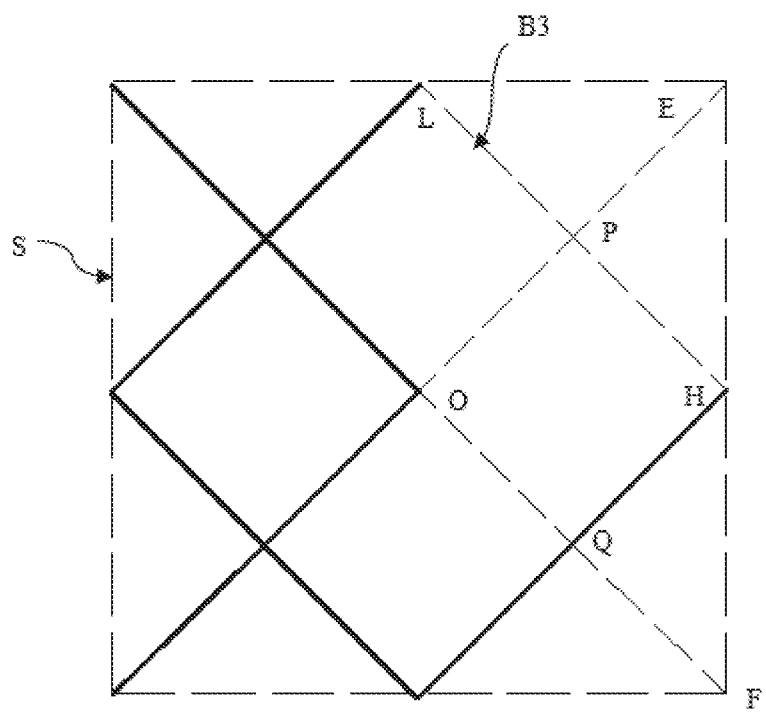
FIG. 24 is a schematic diagram of actual wiring of a touch electrode repetition unit in FIG. 23.

The ninth embodiment provided by the present disclosure is shown in FIGS. 23 to 24. The touch display panel includes a touch electrode wiring layer 1 and a signal transmission wiring layer 2. The related structure and design of the signal transmission wiring layer 2 are the same as the sixth embodiment and will not be repeatedly described here.

The touch electrode wiring layer 1 includes a plurality of touch sub-units 11 arranged in an array manner. Each touch sub-unit 11 is a grid-like electrode pattern surrounded by straight-line segments. The touch sub-units 11 located in a same column are connected to each other to complete transmission of touch signals in the column direction. The touch sub-units 11 located in a same row are electrically connected by the connection wire 12 to complete the transmission of touch signals in the row direction.

As shown in FIG. 23, the touch electrode wiring layer 1 includes a plurality of touch electrode repetition units S arranged in an array manner. The touch electrode repetition unit S includes a plurality of touch sub-units 11 arranged in an array manner. The touch electrode repetition unit S has a grid-like rectangular predetermined wiring pattern A, as shown in FIG. 19. The predetermined wiring pattern A includes two predetermined diagonal lines and predetermined connection lines connecting four midpoints of four edges.

In this embodiment, the touch electrode repetition unit S is provided with a third hollow pattern B3 based on the predetermined wiring pattern A. In combination with FIGS. 19 and 24, it can be determined that the third hollow pattern B3 is composed of six broken lines.

The two diagonal lines are a first predetermined diagonal line 51 and a second predetermined diagonal line 52. The first predetermined diagonal line 51 connects an upper-left vertex and a lower-right vertex F of the predetermined wiring pattern A. The second predetermined diagonal line 52 connects the upper right vertex E and the lower-left vertex of the predetermined wiring pattern A. An intersection point of the first predetermined diagonal line 51 and the second predetermined diagonal line 52 is a point 0.

The predetermined connection lines connecting the midpoints of the four edges include a first predetermined connection line 61, a second predetermined connection line 62, a third predetermined connection line 63, and a fourth predetermined connection line 64. The first predetermined connection line 61 and the fourth predetermined connection line 64 are parallel and opposite to each other. The second predetermined connection line 62 and the third predetermined connection line 63 are parallel and opposite to each other. The first predetermined connection line 61 is a connection line between a midpoint L of an upper edge of the predetermined wiring pattern A and a midpoint of a left edge of the predetermined wiring pattern A. The fourth predetermined connection 64 is a connection line between a midpoint H of a right line of the predetermined wiring pattern A and a midpoint of a lower edge of the predetermined wiring pattern A. An intersection point of the third predetermined connection line 63 and the second predetermined diagonal line 52 is a point P. An intersection point of the fourth predetermined connection line 64 and the first predetermined diagonal line 51 is a Q point.

As shown in FIG. 24, comparing the actual wiring diagram of the touch electrode repetition unit S with the predetermined wiring pattern A, it can be seen that the third hollow pattern B3 includes a first broken line LP, a second broken line OP, a third broken line OQ, a four broken lines PE, a fifth broken lines PH, and a sixth broken line QF.

The third hollow area B3 in this embodiment is evenly distributed in the column direction between two adjacent columns of the touch sub-units 11. It is ensured that the number of connection wires 12 connected to each row of touch sub-units 11 on the touch electrode wiring layer 1 is the same and is a fixed value. Areas where the orthographic projection of each signal transmission wire 21 on the touch electrode wiring layer 1 overlaps with all of the connection wires 12 are equal. Namely, the areas where the orthographic projection of each signal transmission wire 21 on the touch electrode wiring layer 1 overlaps with all of the connection wires 12 are a fixed value. By the above configuration, this embodiment can achieve the same parasitic capacitance between each signal transmission wire 21 and the connection wires 12, and ensure the uniform distribution of the touch signal amount on the touch display panel to the greatest extent, so as not to affect the touch control linearity.

In addition, the number of broken lines included in the third hollow area B3 in this embodiment is greater than the number of broken lines included in the first hollow area B1 and the number of broken lines included in the second hollow area B2. Therefore, the parasitic capacitance between the signal transmission wires 21 and the connection wires 12 overlapping the third hollow area B3 is smaller, which is beneficial to the improvement of the touch performance of the touch display panel.

In the present disclosure, the signal transmission wires are arranged between two adjacent columns of the touch sub-units to reduce the area where each of the signal transmission wires overlaps with the touch electrode, which can reduce the parasitic capacitance of the touch structure and improve the touch performance and experience of the touch display panel.

A detailed introduction to a touch display panel provided by the embodiments of the present disclosure is provided as above. Specific examples are used in this article to illustrate the principles and implementations of the present disclosure. The descriptions of the above embodiments are only used to help understand the present disclosure. At the same time, according to the idea of the present disclosure, for those skilled in the art, there will be changes in the specific implementation and the scope of application. In summary, the content of this specification should not be construed as a limitation to the present disclosure.

What is claimed is:

1. A touch display panel, comprising a touch electrode wiring layer and a signal transmission wiring layer, wherein the touch electrode wiring layer comprises a plurality of touch electrode repetition units, each of the touch electrode repetition units comprises a plurality of touch sub-units and a plurality of connection wires, the plurality of touch sub-units comprise a part of the touch sub-units extending in a first direction and a part of the touch sub-units extending in a second direction, and two adjacent columns of the touch sub-units extending in the second direction are electrically connected via the connection wires;

wherein the signal transmission wiring layer comprises a plurality of signal transmission wires extending in the second direction; wherein an orthographic projection of each of the signal transmission wires on the touch electrode wiring layer is located between two adjacent columns of the touch sub-units, and the orthographic projection of each of the signal transmission wires on the touch electrode wiring layer at least partially overlaps with one of the connection wires;

wherein in each of the touch electrode repetition units, the connection wires distributed in the first direction are disposed in a misaligned manner in the second direction;

wherein in each of the touch electrode repetition units, two of the connection wires adjacent to each other in the first direction are disposed in a misaligned manner in the second direction;

wherein in each of the touch electrode repetition units, two adjacent columns of the touch sub-units extending in the second direction are electrically connected via at least one of the connection wires;

wherein in each of the touch electrode repetition units, only one of the connection wires is provided in one row of touch sub-units extending in the first direction.

2. The touch display panel as claimed in claim 1, wherein the plurality of connection wires in each of the touch electrode repetition units are distributed in a stepped manner.

3. The touch display panel as claimed in claim 1, wherein the touch electrode wiring layer comprises the plurality of touch electrode repetition units arranged in an array manner, and the plurality of touch sub-units in each of the touch electrode repetition units are arranged in an array manner, a row direction of the plurality of touch sub-units is parallel to the first direction, and a column direction of the plurality of touch sub-units is parallel to the second direction;

in each of the touch electrode repetition units, at least one position for each column of touch sub-units connected to at least one of the connection wires is configured to define at least one connection position of the column of touch sub-units; each column of touch sub-units in each of the touch electrode repetition units has only one connection position;

a position in the column direction for a first connection wire connected to a first column of touch sub-units in each of the touch electrode repetition units is configured to define an initial connection position of the touch electrode repetition unit; and the connection position for a second column of touch sub-units in each of the touch electrode repetition units is located at an intermediate position in the column direction between two of the initial connection positions adjacent in the column direction, and a second connection wire is connected to the second column of touch sub-units at the connection position for the second column of touch sub-units.

4. The touch display panel as claimed in claim 3, wherein the connection position for a third column of touch sub-units in each of the touch electrode repetition units is located at an intermediate position in the column direction between the initial connection position and the connection position for the second column of touch sub-units, and a third connection wire is connected to the third column of touch sub-units at the connection position for the third column of touch sub-units; and the connection position for a fourth column of touch sub-units in each of the touch electrode repetition units is located at an intermediate position in the column direction between the initial connection position of the touch electrode repetition unit and the connection position for the second column of touch sub-units adjacent in the column direction, and a fourth connection wire is connected to the fourth column of touch sub-units at the connection position for the fourth column of touch sub-units.

5. The touch display panel as claimed in claim 3, wherein each of the touch electrode repetition units comprises six columns of the touch sub-units, each column of touch sub-units comprises six rows of the touch sub-units, and the touch electrode repetition unit comprises six of the connection wires; and the touch sub-unit located in the first row of the first column is connected to the first connection wire, the touch sub-unit located in the fourth row of the second column is connected to the second connection wire, the touch sub-unit located in the second row of the third column is connected to a third connection wire, the touch sub-unit located in the fifth row of the fourth column is connected to a fourth connection wire, the touch sub-unit located in the third row of the fifth column is connected to a fifth connection wire, and the touch sub-unit located in the sixth row of the sixth column is connected to a sixth connection wire.

6. The touch display panel as claimed in claim 1, wherein each of the connection wires has an arc and/or a corner.

7. The touch display panel as claimed in claim 6, wherein an orientation of the arc or the corner of one of the connection wires is opposite to an orientation of the arc or the corner of another of the connection wires adjacent to the one of the connection wires.

8. The touch display panel as claimed in claim 1, wherein the plurality of the connection wires are evenly distributed in the second direction.

9. The touch display panel as claimed in claim 1, wherein the touch electrode wiring layer comprises the plurality of touch electrode repetition units arranged in an array manner, and each of the touch electrode repetition units comprises the plurality of touch sub-units arranged in an array manner;

each of the touch electrode repetition units comprises a first column of touch sub-units, a second column of touch sub-units, and a third column of touch sub-units, the second column of touch sub-units is located between the first column of touch sub-units and the third column of touch sub-units, the second column of touch sub-units is disposed adjacent to the first column of touch sub-units and the third column of touch sub-units; the first column of touch sub-units and the second column of touch sub-units are electrically connected via M connection wires, the second column of touch sub-units and the third column of touch sub-units are electrically connected via N connection wires, M and N are both odd-numbers, and M and N are equal;

the touch electrode repetition unit is divided into a first repetition sub-unit and a second repetition sub-unit in a column direction;

there are m1 connection wires between the first and second columns of the touch sub-units located in the first repetition sub-unit, and there are m2 connection wires between the first and second columns of the touch sub-units located in the second repetition sub-units, m1 is an odd number, m2 is an even number, and a sum of m1 and m2 is M; and there are n1 connection wires between the second and third columns of the touch sub-units located in the first repetition sub-unit, and there are n2 connection wires between the second and third columns of the touch sub-units located in the second repetition sub-units, n1 is an even number, n2 is an odd number, and a sum of n1 and n2 is N.

10. A touch display panel, comprising a touch electrode wiring layer and a signal transmission wiring layer, wherein the touch electrode wiring layer comprises a plurality of touch electrode repetition units, each of the touch electrode repetition units comprises a plurality of touch sub-units and a plurality of connection wires, the plurality of touch sub-units comprise a part of the touch sub-units extending in a first direction and a part of the touch sub-units extending in a second direction, and two adjacent columns of the touch sub-units extending in the second direction are electrically connected via the connection wires;

wherein the signal transmission wiring layer comprises a plurality of signal transmission wires extending in the second direction; wherein an orthographic projection of each of the signal transmission wires on the touch electrode wiring layer is located between two adjacent columns of the touch sub-units, and the orthographic projection of each of the signal transmission wires on the touch electrode wiring layer at least partially overlaps with one of the connection wires;

wherein an area where an orthographic projection of each of the signal transmission wires on the touch electrode wiring layer overlaps with the connection wire is equal;

wherein the touch electrode wiring layer comprises the plurality of touch electrode repetition units arranged in an array manner, each of the touch electrode repetition units has a grid-like rectangle predetermined wiring pattern including two predetermined diagonal lines and predetermined connection lines connecting four midpoints of four edges; and each of the touch electrode repetition units is provided with a hollow pattern based on the predetermined wiring pattern, the hollow pattern is composed of a plurality of broken lines, the plurality of broken lines are a part of the predetermined diagonal lines and the predetermined connection lines, and the hollow pattern is distributed uniformly in the column direction between two adjacent columns of the touch sub-units;

wherein the two diagonal lines are a first predetermined diagonal line and a second predetermined diagonal line, the first predetermined diagonal line intersects with the second predetermined diagonal line, the second predetermined diagonal line connects an upper-right vertex and a lower-left vertex of the predetermined wiring pattern;

the predetermined connection lines connecting the midpoints of the four edges comprise a first predetermined connection line, a second predetermined connection line, a third predetermined connection line, and a fourth predetermined connection line, the first predetermined connection line is parallel and opposite to the fourth predetermined connection line, the second predetermined connection line is parallel and opposite to the third predetermined connection line; the first predetermined connection line is a connection line between a midpoint of an upper edge of the predetermined wiring pattern and a midpoint of a left edge of the predetermined wiring pattern;

the third predetermined connection line intersects with the second predetermined diagonal line, the fourth predetermined connection line intersects with the first predetermined diagonal line.

11. The touch display panel as claimed in claim 10, wherein the touch electrode wiring layer comprises the plurality of touch electrode repetition units arranged in an array manner, and each of the touch electrode repetition units comprises the plurality of touch sub-units arranged in an array manner;

each of the touch electrode repetition units comprises a first column of touch sub-units, a second column of touch sub-units, and a third column of touch sub-units, the second column of touch sub-units is located between the first column of touch sub-units and the third column of touch sub-units, the second column of touch sub-units is disposed adjacent to the first column of touch sub-units and the third column of touch sub-units; the first column of touch sub-units and the second column of touch sub-units are electrically connected via M connection wires, the second column of touch sub-units and the third column of touch sub-units are electrically connected via N connection wires, M and N are both odd-numbers, and M and N are equal;

each of the touch electrode repetition units is divided into a first repetition sub-unit and a second repetition sub-unit in a column direction;

there are m1 connection wires between the first and second columns of the touch sub-units located in the first repetition sub-unit, and there are m2 connection wires between the first and second columns of the touch sub-units located in the second repetition sub-units, m1 is an odd number, m2 is an even number, and a sum of m1 and m2 is M; and there are n1 connection wires between the second and third columns of the touch sub-units located in the first repetition sub-unit, and there are n2 connection wires between the second and third columns of the touch sub-units located in the second repetition sub-units, n1 is an even number, n2 is an odd number, and a sum of n1 and n2 is N.

12. The touch display panel as claimed in claim 10, further comprising a plurality of redundant touch sub-units arranged in an array manner; wherein a plurality of redundant compensation electrode patterns are provided between the redundant touch sub-units and the touch sub-units adjacent to the redundant touch sub-units in a row direction, and the redundant compensation electrode patterns are located on the signal transmission wiring layer.

13. The touch display panel as claimed in claim 10, further comprising a plurality of redundant signal transmission wires; wherein a plurality of redundant compensation electrode patterns are provided between adjacent two of the redundant signal transmission wires, and the redundant compensation electrode patterns are located on the touch electrode wiring layer.

14. The touch display panel as claimed in claim 10, wherein the plurality of touch sub-units and the plurality of the connection wires enclose to form a plurality of hollow areas, and the hollow areas are evenly distributed in the column direction between two adjacent columns of the touch sub-units.

15. The touch display panel as claimed in claim 10, wherein each of the touch electrode repetition units is provided with a first hollow pattern based on the predetermined wiring pattern, and the first hollow pattern is composed of three broken lines; and the first hollow pattern comprises a first broken line, a second broken line, and a third broken line.

16. The touch display panel as claimed in claim 1, wherein in each of the touch electrode repetition units, one of the connection wires is provided between two adjacent columns of the touch sub-units extending in the second direction.

\* \* \* \* \*